(12) United States Patent  (10) Patent No.: US 9,335,543 B2
Mizoguchi et al.                (45) Date of Patent:      May 10, 2016

(54) OPTICAL SCANNER, IMAGE DISPLAY DEVICE, HEAD MOUNT DISPLAY, AND HEADS-UP DISPLAY

(71) Applicant: Seiko Epson Corporation, Tokyo (JP)

(72) Inventors: Yasushi Mizoguchi, Suwa (JP); Hisako Kojima, Chino (JP)

(73) Assignee: Seiko Epson Corporation (JP)

( * ) Notice: Subject to any disclaimer, the term of this patent is extended or adjusted under 35 U.S.C. 154(b) by 14 days.

(21) Appl. No.: 14/525,784

(22) Filed: Oct. 28, 2014

(65) Prior Publication Data

US 2015/0116806 A1     Apr. 30, 2015

(30) Foreign Application Priority Data

Oct. 29, 2013  (JP) ................. 2013-223979

(51) Int. Cl.
*G02B 26/08*    (2006.01)
*G02B 26/10*    (2006.01)
*B60K 35/00*    (2006.01)
*G02B 27/01*    (2006.01)

(52) U.S. Cl.
CPC .............. *G02B 26/101* (2013.01); *B60K 35/00* (2013.01); *G02B 26/0858* (2013.01); *G02B 27/0149* (2013.01); *G02B 27/0176* (2013.01); *G02B 27/01* (2013.01); *G02B 27/017* (2013.01); *G02B 2027/015* (2013.01); *G02B 2027/0178* (2013.01)

(58) Field of Classification Search
CPC ............ G02B 26/105; G02B 26/0858; G02B 26/101; G02B 26/085; G02B 26/10; G02B 26/0841; G02B 26/0833; G02B 27/01; G02B 27/017; G02B 27/0176; G02B 2027/0154; G02B 2027/0178; G02B 27/0149
See application file for complete search history.

(56) References Cited

U.S. PATENT DOCUMENTS

| 5,912,608 | A | 6/1999 | Asada |
| 7,408,690 | B2 | 8/2008 | Mizoguchi |
| 7,436,567 | B2 | 10/2008 | Ueyama |
| 7,515,323 | B2 | 4/2009 | Mizoguchi |
| 7,872,789 | B2 | 1/2011 | Sendo |
| 2010/0245966 | A1* | 9/2010 | Yasuda ............... H01L 41/0953 359/224.1 |

FOREIGN PATENT DOCUMENTS

| JP | 08-322227 A | 12/1996 |
| JP | 2005-250077 A | 9/2005 |
| JP | 2006-330399 A | 12/2006 |

(Continued)

*Primary Examiner* — James Phan
(74) *Attorney, Agent, or Firm* — Harness, Dickey & Pierce, P.L.C.

(57) ABSTRACT

An optical scanner includes: a movable plate which includes a light reflection unit; a first torsion bar which oscillatably supports the movable plate around a first axis; a first displacement member which is connected to the first torsion bar; a second torsion bar which oscillatably supports the first displacement member around a second axis; a second displacement member which is connected to the second torsion bar; and an actuator which is installed on the second displacement member and applies a displacement to the second displacement member so as to apply torsional deformation and bending deformation to the second torsion bar, in which the first displacement member includes a frame member surrounding the movable plate, and a damper which has a smaller thickness than that of the frame member and extends in a direction intersecting with a direction in which the second torsion bar extends from the frame member.

8 Claims, 14 Drawing Sheets

(56) References Cited

FOREIGN PATENT DOCUMENTS

| JP | 2007-307662 A | 11/2007 |
| JP | 2008-040353 A | 2/2008 |
| JP | 2008-076570 A | 4/2008 |
| JP | 2008-102362 A | 5/2008 |
| JP | 2009-002978 A | 1/2009 |
| JP | 2011-091209 A | 5/2011 |
| JP | 5151065 B2 | 2/2013 |

* cited by examiner

OPTICAL SCANNER, IMAGE DISPLAY DEVICE, HEAD MOUNT DISPLAY, AND HEADS-UP DISPLAY

BACKGROUND

1. Technical Field

The present invention relates to an optical scanner, an image display device, a head mount display, and a heads-up display.

2. Related Art

An optical scanner for performing drawing by optical scanning has been used in a laser printer or an image display device. JP-A-2009-2978 discloses an optical scanner including torsion bars in two directions which are orthogonal to each other. By doing so, in the optical scanner, a movable plate is oscillatably supported by a pair of first torsion bars. A surface reflecting light is installed in the movable plate. The other end of the first torsion bar is connected to a frame-shaped displacement portion. In addition, the displacement portion is oscillatably supported by a second torsion bar. The other end of the second torsion bar is supported by a frame-shaped support portion. A direction in which the first torsion bar extends is set as a first direction, and a direction in which the second torsion bar extends is set as a second direction. The first direction and the second direction are orthogonal to each other. Accordingly, the movable plate can be oscillated by using the two directions orthogonal to each other as rotation axes.

In a plan view seen from a thickness direction of the movable plate, a unimorph driving unit is provided in the support portion with the second torsion bar interposed therebetween. The unimorph driving unit is a member for distorting and driving a piezoelectric element. The unimorph driving unit performs driving for twisting and driving for bending the second torsion bar. The movable plate and the displacement portion rotate by using the second direction as a rotation axis, when the second torsion bar is twisted. The movable plate rotates by using the first direction as a rotation axis, when the second torsion bar is bent. The unimorph driving unit is driven in a predetermined period. Accordingly, the movable plate and the displacement portion are oscillated by using the two directions orthogonal to each other as rotation axes.

The unimorph driving unit bends the second torsion bar by a horizontal scanning driving signal and twists the second torsion bar by a vertical scanning driving signal. The horizontal scanning driving signal has a frequency higher than that of the vertical scanning driving signal. The movable plate and the displacement portion are oscillated by the vertical scanning driving signal by using the second direction as a rotation axis. The movable plate is oscillated by the horizontal scanning driving signal by using the first direction as rotation axis.

JP-A-2005-250077 discloses an optical scanner including torsion bars in one direction. By doing so, in the optical scanner, a first movable plate is oscillatably supported by a pair of the torsion bars. One torsion bar portion is fixed to a support. The other torsion bar portion is connected to a second movable plate. A coil is installed on the second movable plate and a magnetic field acts on the coil, and accordingly the second movable plate is oscillated. The first movable plate oscillates by oscillation of the second movable plate. The second movable plate has a damper structure. A Q value of the optical scanner is decreased by the damper structure. This damper structure is not a mechanism for suppressing mutual effects of the two movable plates.

A miniaturized optical scanner is desirable in order to use the optical scanner in a portable device. When miniaturizing the optical scanner disclosed in JP-A-2009-2978, it is also necessary to miniaturize the displacement portion. When the displacement portion is miniaturized, an inertia moment of the displacement portion decreases. Accordingly, the displacement portion is easily affected by vibration with a high frequency. When the displacement portion oscillates by using the second direction as a rotation axis, the displacement portion is affected by the horizontal scanning driving signal, in addition to the vertical scanning driving signal. Since the movable plate oscillates by the oscillation of the displacement portion, the movable plate is affected by the horizontal scanning driving signal when being oscillated by using the second direction of the movable plate as a rotation axis. As a result, the movable plate is operated with an oscillation component which is unnecessary for the vertical scanning. Therefore, an optical scanner having an improved vibration performance so that the horizontal scanning hardly affects the vertical scanning even with the miniaturized optical scanner, has been desired.

SUMMARY

An advantage of some aspects of the invention is to solve the problems described above, and the invention can be implemented as the following forms or application examples.

APPLICATION EXAMPLE 1

This application example is directed to an optical scanner including: a movable plate which includes a light reflection unit which reflects light; a first torsion bar which oscillatably supports the movable plate around a first axis; a first displacement portion which is connected to the first torsion bar; a second torsion bar which oscillatably supports the first displacement portion around a second axis intersecting with the first axis; a second displacement portion which is connected to the second torsion bar; and an actuator which is installed on the second displacement portion and applies a displacement to the second displacement portion so as to apply torsional deformation and bending deformation to the second torsion bar, in which the first displacement portion includes a frame portion surrounding the movable plate, and a damper portion which has a smaller thickness than that of the frame portion and extends in a direction intersecting with a direction in which the second torsion bar extends from the frame portion.

According to this application example, one end of the first torsion bar supports the movable plate and the other end of the first torsion bar is connected to the first displacement portion. The first displacement portion is supported by the second torsion bar and the second torsion bar is connected to the second displacement portion. The direction in which the first torsion bar extends and the direction in which the second torsion bar extends intersect with each other. The movable plate oscillates around the first axis which is a shaft of the first torsion bar, and the first displacement portion oscillates around the second axis which is a shaft of the second torsion bar. Accordingly, the light reflection unit oscillates around the two directions intersecting with each other.

The actuator is installed on the second displacement portion. The actuator applies a displacement to the second displacement portion so as to add torsion deformation and bending deformation to the second torsion bar. The torsion deformation causes the first displacement portion to oscillate and the bending deformation causes the movable plate to oscillate. Accordingly, the optical scanner can cause the light reflection unit to oscillate around the two directions intersecting with each other. The first displacement portion includes the frame portion and the damper portion. The frame portion maintains a relative position of the first torsion bar and the second torsion bar. The damper portion extends in a direction intersecting with a direction in which the second torsion bar extends from the frame portion. When the first displacement portion oscillates around the second axis, the damper portion functions as a damper by generating an air current around the damper portion. Accordingly, it is possible to set the first displacement portion to hardly react with respect to the driving with the high frequency. Thus, when the light reflection unit oscillates around the second axis, it is possible to set the light reflection unit to hardly react with respect to the driving with the high frequency. As a result, it is possible to improve the vibration performance of the light reflection unit.

APPLICATION EXAMPLE 2

In the optical scanner according to the application example described above, a thickness of the damper portion at a position separated from the second torsion bar is greater than a thickness thereof at a position closer to the second torsion bar.

According to this application example, the damper portion becomes thicker at the position separated from the second torsion bar than the position close thereto. Accordingly, it is possible to increase an inertia moment of the first displacement portion, compared to when the thickness of the damper portion at the position separated from the second torsion bar is thin. Accordingly, it is possible to set the first displacement portion to hardly react with respect to the driving with the high frequency. Thus, when the light reflection unit oscillates around the second axis, it is possible to set the light reflection unit to hardly react with respect to the driving with the high frequency. As a result, it is possible to improve the vibration performance of the light reflection unit.

APPLICATION EXAMPLE 3

In the optical scanner according to the application example described above, a length of the first displacement portion in a direction in which the first torsion bar extends is greater than a length of the first displacement portion in a direction in which the second torsion bar extends.

According to this application example, the lengths of the first displacement portion in the two directions intersecting with each other are different from each other. A length of the first displacement portion in a direction in which the first torsion bar extends is set as a first length. A length of the first displacement portion in a direction in which the second torsion bar extends is set as a second length. The first length is set to be greater than the second length. Accordingly, when the first displacement portion oscillates around the second axis, a movement amount of the damper portion is great, compared to when the first displacement portion oscillates around the first axis. Accordingly, when the first displacement portion oscillates around the second axis, resistance increases, compared to when the first displacement portion oscillates around the first axis. As a result, it is possible to set the first displacement portion to hardly react around the second axis with respect to the driving with the high frequency.

APPLICATION EXAMPLE 4

In the optical scanner according to the application example described above, the light reflection unit includes a reflection plate and a support which supports the reflection plate, and the reflection plate and the first displacement portion are installed at an interval in a thickness direction of the reflection plate, and a part of the reflection plate in a plan view seen from a thickness direction of the reflection plate is overlapped with the first displacement portion.

According to this application example, the reflection plate and the first displacement portion are installed at an interval. In a plan view seen from the thickness direction of the reflection plate, the reflection plate is overlapped with the first displacement portion. In this configuration, a length of the first displacement portion can be set to be small, compared to when the reflection plate and the first displacement portion are positioned on the same plane. Accordingly, it is possible to provide the miniaturized optical scanner.

APPLICATION EXAMPLE 5

In the optical scanner according to the application example described above, a portion of the damper portion at a position with a great thickness is protruded to the opposite side to the side where the frame portion is protruded in the thickness direction with respect to the damper portion.

According to this application example, the side where the frame portion is protruded in the thickness direction with respect to the damper portion and the side where the position with a great thickness of the damper portion is protruded are opposite to each other. Accordingly, the first displacement portion of this application example may decrease the inertia moment with respect to the axis of the second torsion bar, compared to a structure in which the side where the frame portion is protruded in the thickness direction with respect to the damper portion and the side where a portion of the damper portion at the position with a great thickness is protruded are the same sides. It is possible to obtain a balanced inertia moment of the first displacement portion, and unnecessary vibration for the torsion operation around the axes of the second torsion bar is unlikely to be superposed. In addition, since a gravity center of the first displacement portion may become closer to the axis of the second torsion bar, it is possible to reduce combined stress due to the torsion stress and bending stress applied to the second torsion bar.

APPLICATION EXAMPLE 6

This application example is directed to an image display device including: a light source which emits light; and an optical scanner, in which the optical scanner includes a movable plate which includes a light reflection unit which reflects light, a first torsion bar which oscillatably supports the movable plate around a first axis, a first displacement portion which is connected to the first torsion bar, a second torsion bar which oscillatably supports the first displacement portion around a second axis intersecting with the first axis, a second displacement portion which is connected to the second torsion bar, and an actuator which is installed on the second displacement portion and applies a displacement to the second displacement portion so as to apply torsional deformation and bending deformation to the second torsion bar, and the first displacement portion includes a frame portion surrounding the movable plate, and a damper portion which has a smaller thickness than that of the frame portion and extends in a direction intersecting with a direction in which the second torsion bar extends from the frame portion.

According to this application example, the light reflection unit reflects the light emitted from the light source. Since the light reflection unit oscillates around the two directions intersecting with each other, the image display device may display an image by changing a movement direction of the light. When the first displacement portion oscillates around the second axis, the damper portion functions as a damper by flowing the air current around the damper portion. Accordingly, it is possible to set the first displacement portion to hardly react with respect to the driving with the high frequency. Thus, when the light reflection unit oscillates around the second axis, it is possible to set the light reflection unit to hardly react with respect to the driving with the high frequency. As a result, the image display device may improve the vibration performance of the light reflection unit.

APPLICATION EXAMPLE 7

This application example is directed to a head mount display including: a frame to be mounted on a head of a viewer; a light source which emits light; and an optical scanner provided on the frame, in which the optical scanner includes a movable plate which includes a light reflection unit which reflects light, a first torsion bar which oscillatably supports the movable plate around a first axis, a first displacement portion which is connected to the first torsion bar, a second torsion bar which oscillatably supports the first displacement portion around a second axis intersecting with the first axis, a second displacement portion which is connected to the second torsion bar, and an actuator which is installed on the second displacement portion and applies a displacement to the second displacement portion so as to apply torsional deformation and bending deformation to the second torsion bar, and the first displacement portion includes a frame portion surrounding the movable plate, and a damper portion which has a smaller thickness than that of the frame portion and extends in a direction intersecting with a direction in which the second torsion bar extends from the frame portion.

According to this application example, a viewer can mount the head mount display on the viewer's head by using the frame. In the head mount display, the light source emits light to the optical scanner. In the optical scanner, the light reflection unit reflects the light emitted from the light source. Since the light reflection unit oscillates around the axes of the two directions intersecting with each other, the optical scanner emits light by changing the movement direction of the light. Accordingly, the head mount display may display an image. When the first displacement portion oscillates around the second axis, the damper unit functions as a damper by flowing the air current around the damper unit. Thus, it is possible to set the first displacement portion to hardly react with respect to the driving with high frequency. Therefore, when the light reflection unit oscillates around the second axis, it is possible to set the light reflection unit to hardly react with respect to the driving with high frequency. As a result, the head mount display may be set as a device including an optical scanner having excellent vibration performance.

APPLICATION EXAMPLE 8

This application example is directed to a heads-up display which emits light on a windshield of a vehicle, including: a light source which emits light; and an optical scanner, in which the optical scanner includes a movable plate which includes a light reflection unit which reflects light, a first torsion bar which oscillatably supports the movable plate around a first axis, a first displacement portion which is connected to the first torsion bar, a second torsion bar which oscillatably supports the first displacement portion around a second axis intersecting with the first axis, a second displacement portion which is connected to the second torsion bar, and an actuator which is installed on the second displacement portion and applies a displacement to the second displacement portion so as to apply torsional deformation and bending deformation to the second torsion bar, and the first displacement portion includes a frame portion surrounding the movable plate, and a damper portion which has a smaller thickness than that of the frame portion and extends in a direction intersecting with a direction in which the second torsion bar extends from the frame portion.

According to this application example, in the heads-up display, the optical scanner emits the light emitted by the light source on a windshield of a vehicle. In the optical scanner, the light reflection unit reflects the light emitted from the light source. Since the light reflection unit oscillates around the axes of the two directions intersecting with each other, the heads-up display may display an image by changing the movement direction of the light. When the first displacement portion oscillates around the second axis, the damper portion functions as a damper by flowing the air current around the damper portion. Accordingly, it is possible to set the first displacement portion to hardly react with respect to the driving with the high frequency. Thus, when the light reflection unit oscillates around the second axis, it is possible to set the light reflection unit to hardly react with respect to the driving with the high frequency. As a result, the heads-up display may be set as a device including an optical scanner with excellent vibration performance.

BRIEF DESCRIPTION OF THE DRAWINGS

Embodiments of the invention will be described with reference to the accompanying drawings, wherein like numbers reference like elements.

FIGS. 11A and 11B illustrate a second embodiment, in which FIG. 11A is a schematic plan view showing a structure of an optical scanner and FIG. 11B is a schematic cross-sectional side view showing a structure of an optical scanner.

FIGS. 12A and 12B illustrate a third embodiment, in which FIG. 12A is a schematic plan view showing a structure of an optical scanner and FIG. 12B is a schematic cross-sectional side view showing a structure of an optical scanner.

FIGS. 13A and 13B illustrate a fourth embodiment, in which FIG. 13A is a schematic plan view showing a structure of an optical scanner and FIG. 13B is a schematic cross-sectional side view showing a structure of an optical scanner.

DESCRIPTION OF EXEMPLARY EMBODIMENTS

In the embodiments, characteristic examples of an image display device, an optical scanner, a heads-up display, a head mount display, and a manufacturing method of the optical scanner will be described with reference to accompanied drawings. Since each member in each drawing is shown with a size to be recognized in each drawing, the drawings are shown with different reduction scales for each member.

First Embodiment

Image Display Device

Figure 1:
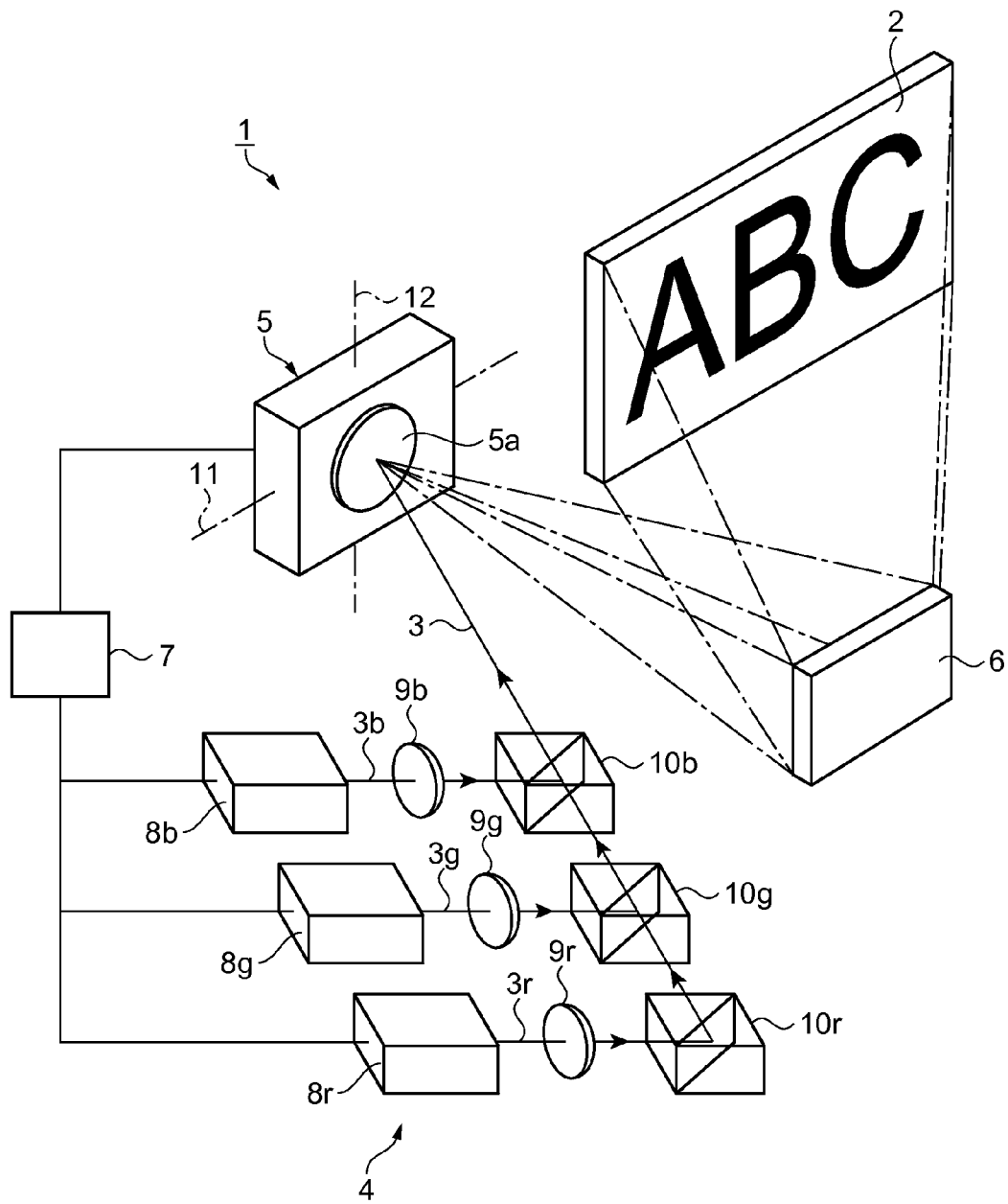
FIG. 1 is a schematic perspective view showing a configuration of an image display device according to a first embodiment.

A configuration of an image display device will be described with reference to FIG. 1. FIG. 1 is a schematic perspective view showing a configuration of an image display device. An image display device 1 shown in FIG. 1 is a device which displays an image by two-dimensionally scanning drawing laser light 3 as light on a screen 2 such as a screen or a wall surface. The image display device 1 includes a drawing light source unit 4 as a light source which emits the drawing laser light 3, an optical scanner 5 which scans the drawing laser light 3, a mirror 6 which reflects the drawing laser light 3 scanned by the optical scanner 5, and a control unit 7 which controls operations of the drawing light source unit 4 and the optical scanner 5. The mirror 6 may be provided if desired, and may be omitted.

The drawing light source unit 4 includes laser light sources 8r, 8g, and 8b as red, green, and blue light sources, collimator lenses 9r, 9g, 9b and dichroic mirrors 10r, 10g, and 10b which are provided to correspond to the laser light sources 8r, 8g, and 8b.

Each of the laser light sources 8r, 8g, and 8b includes a driving circuit (not shown) which drives the light source. The laser light source 8r emits a red laser light beam 3r, the laser light source 8g emits a green laser light beam 3g, and the laser light source 8b emits a blue laser light beam 3b. Each of the laser light beams 3r, 3g, and 3b is emitted corresponding to a driving signal transmitted from the control unit 7, and is set to a parallel light beam or an approximately parallel light beam by the collimator lenses 9r, 9g, and 9b. As the laser light sources 8r, 8g, and 8b, a semiconductor laser such as an edge emitting semiconductor laser or a surface emitting semiconductor laser can be used, for example. By using the semiconductor laser, it is possible to provide miniaturized laser light sources 8r, 8g, and 8b.

The dichroic mirror 10r, the dichroic mirror 10g, and the dichroic mirror 10b are disposed according to the disposition of the laser light sources 8r, 8g, and 8b. The dichroic mirror 10r has a property of reflecting the laser light beam. 3r. The dichroic mirror 10g has a property of reflecting the laser light beam 3g and transmitting the laser light beam 3r. The dichroic mirror 10b has a property of reflecting the laser light beam 3b and transmitting the laser light beams 3r and 3g. Laser light beams 3r, 3g, and 3b with the colors are synthesized to be the drawing laser light 3 by the dichroic mirrors 10r, 10g, and 10b.

The optical scanner 5 includes a reflection surface 5a as a light reflection unit, and the drawing laser light 3 emitted by the drawing light source unit 4 is emitted to the reflection surface 5a. The optical scanner 5 oscillates the reflection surface 5a by using a horizontal axis 11 as a second axis, and oscillates the reflection surface 5a by using a vertical axis 12 as a first axis. Accordingly, the drawing laser light 3 can be scanned in two directions of the vertical and horizontal directions. That is, the optical scanner 5 has a function of two-dimensionally scanning the drawing laser light 3. The drawing laser light 3 reflected by the reflection surface 5a is reflected by the mirror 6 and emitted to the screen 2. Accordingly, a predetermined pattern is drawn on the screen 2.

Figure 2:
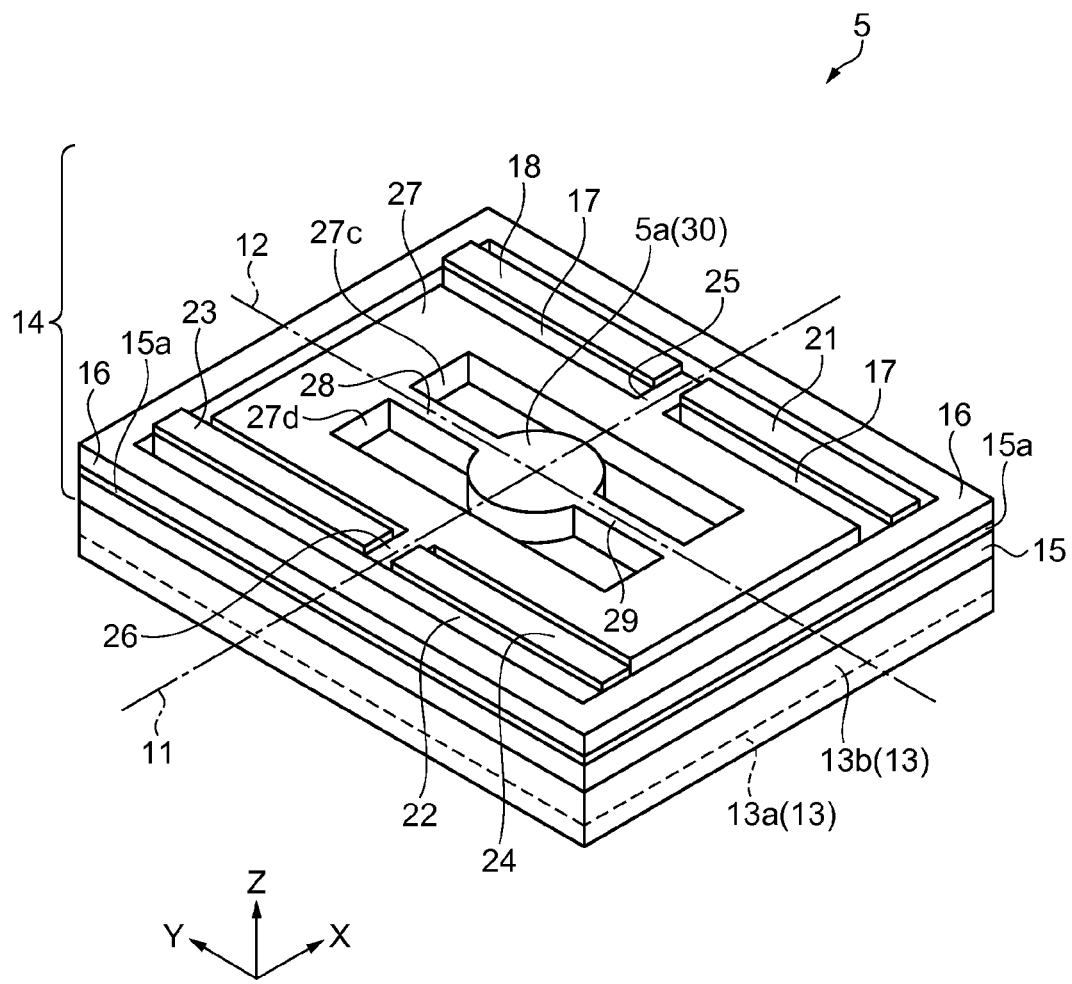
FIG. 2 is a schematic perspective view showing a structure of an optical scanner.

FIG. 2 is a schematic perspective view showing a structure of the optical scanner. As shown in FIG. 2, the optical scanner 5 includes a bottomed square tubular housing 13, and a planar shape of a bottom plate 13a of the housing 13 is a square. A square tubular side plate 13b is provided to stand on the bottom plate 13a.

A direction in which one of the side surfaces of the housing 13 extends is set as an X direction. The X direction is a direction in which the horizontal axis 11 extends. A direction orthogonal to the X direction in the side surface of the housing 13 is set as a Y direction. The Y direction is a direction in which the vertical axis 12 extends. A thickness direction of the housing 13 is set as a Z direction. The side plate 13b of the housing 13 extends from the bottom plate 13a in the Z direction. A structure 14 is disposed inside of the housing 13 and the structure 14 includes the reflection surface 5a. The Z direction is a direction which the reflection surface 5a faces. The X direction, the Y direction, and the Z direction are orthogonal to each other. The drawing laser light 3 is emitted from the Z direction, and the drawing laser light 3 reflected by the reflection surface 5a moves in the Z direction.

The structure 14 includes a square tubular supporting frame portion 15. The supporting frame portion 15 is installed on the side plate 13b. The supporting frame portion 15 is formed of silicon and an oxide film 15a is installed on a surface of the supporting frame portion 15 facing the Z direction side. A square frame-shaped supporting portion 16 is installed on the Z direction side of the supporting frame portion 15. The shapes of the supporting portion 16, the supporting frame portion 15, and the side plate 13b in the Z direction are approximately the same.

A first beam portion 17 as a prismatic second displacement portion which extends in the Y direction is installed on the X direction side inside of the supporting portion 16. The first beam portion 17 is a double-supported beam of which both ends are supported by the supporting portion 16. A first actuator 18 and a second actuator 21 as actuators are installed on the surface of the first beam portion 17 facing the Z direction. The first actuator 18 and the second actuator 21 have a structure in which electrodes are installed on both surfaces of a plate-shaped piezoelectric element. The first actuator 18 is installed on the positive Y direction side of the first beam portion 17 and the second actuator 21 is installed on the negative Y direction side of the first beam portion 17. The first actuator 18 and the second actuator 21 can bend the first beam portion 17.

In the same manner as described above, a second beam portion 22 as a prismatic second displacement portion which extends in the Y direction is installed on the negative X direction side inside of the supporting portion 16. The second beam portion 22 is a double-supported beam of which both ends are supported by the supporting portion 16. A third actuator 23 and a fourth actuator 24 as actuators are installed on the surface of the second beam portion 22 facing the Z direction. The third actuator 23 and the fourth actuator 24 have a structure in which electrodes are installed on both surfaces of a plate-shaped piezoelectric element. The third actuator 23 is installed on the positive Y direction side of the second beam portion 22 and the fourth actuator 24 is installed on the negative Y direction side of the second beam portion 22. The third actuator 23 and the fourth actuator 24 can bend the second beam portion 22. Lead zirconate titanate (PZT) is used for the piezoelectric element of the actuators.

A third shaft portion 25 as a second torsion bar which extends in the X direction is installed at the center of the first beam portion 17 in the Y direction. In the same manner as described above, a fourth shaft portion 26 as a second torsion bar which extends in the X direction is installed at the center of the second beam portion 22 in the Y direction. The third shaft portion 25 and the fourth shaft portion 26 face each other and are disposed along the horizontal axis 11. A displacement portion 27 as a first displacement portion is installed between the third shaft portion 25 and the fourth shaft portion 26. The displacement portion 27 has a square frame shape and is a rectangle having long sides in the Y direction.

One end of the third shaft portion 25 is connected to the first beam portion 17 and the other end thereof is connected to the displacement portion 27. In the same manner as described above, one end of the fourth shaft portion 26 is connected to the second beam portion 22 and the other end thereof is connected to the displacement portion 27. Accordingly, the third shaft portion 25 and the fourth shaft portion 26 have a structure oscillatably supporting the displacement portion 27. The third shaft portion 25 and the fourth shaft portion 26 function as a pair of torsion bars. The torsion bar is also referred to as a torsion bar spring.

A first shaft portion 28 and a second shaft portion 29 as first torsion bars which extend in the Y direction are installed at the center of the displacement portion 27 in the X direction. The first shaft portion 28 and the second shaft portion 29 face each other and are disposed along the vertical axis 12. A movable plate 30 is installed between the first shaft portion 28 and the second shaft portion 29. The first shaft portion 28 is positioned on the Y direction side of the movable plate 30, and the second shaft portion 29 is positioned on the negative Y direction side of the movable plate 30. The movable plate 30 has a disc shape, and a surface on the Z direction side of the movable plate 30 is set as the reflection surface 5a. A hole positioned on the X direction side of the first shaft portion 28 and the second shaft portion 29 in the displacement portion 27 is set as a first hole 27c, and a hole positioned on the negative X direction side of the first shaft portion 28 and the second shaft portion 29 is set as a second hole 27d.

One end of the first shaft portion 28 is connected to the displacement portion 27 and the other end thereof is connected to the movable plate 30. In the same manner as described above, one end of the second shaft portion 29 is connected to the displacement portion 27 and the other end thereof is connected to the movable plate 30. Accordingly, the first shaft portion 28 and the second shaft portion 29 have a structure oscillatably supporting the movable plate 30. The first shaft portion 28 and the second shaft portion 29 function as a pair of torsion bars, and the movable plate 30 oscillates by using the vertical axis 12 as a rotation axis.

The movable plate 30, the first shaft portion 28, and the second shaft portion 29 configure a first vibration system of performing oscillation or reciprocating by using the vertical axis 12 as a rotation axis. The first shaft portion 28 and the second shaft portion 29 function as torsion bars, and the first shaft portion 28 and the second shaft portion 29 have a predetermined spring constant. A natural frequency when the movable plate 30 oscillates around the vertical axis 12 is determined by the spring constant of the first shaft portion 28 and the second shaft portion 29 and an inertia moment of the movable plate 30. The movable plate 30, the first shaft portion 28, the second shaft portion 29, the displacement portion 27, the third shaft portion 25, and the fourth shaft portion 26 configure a second vibration system of performing oscillation or reciprocating by using the horizontal axis 11 as a rotation axis. A natural frequency when the movable plate and the displacement portion 27 oscillate around the horizontal axis 11 is determined by the spring constant of the third shaft portion 25 and the fourth shaft portion 26 and an inertia moment of the movable plate 30, the first shaft portion 28, the second shaft portion 29, and the displacement portion 27.

The movable plate 30 oscillates by using the vertical axis 12 as a rotation axis, and the displacement portion 27 oscillates by using the horizontal axis 11 as a rotation axis. Accordingly, the movable plate 30 and the reflection surface 5a can oscillate around two axes of the horizontal axis 11 and the vertical axis 12 which are orthogonal to each other. The shapes of the first shaft portion 28, the second shaft portion 29, the third shaft portion 25, and the fourth shaft portion 26 are not limited as described above, and may have at least a bent or curved portion or a branched portion in the middle thereof, for example. Each of the first shaft portion 28, the second shaft portion 29, the third shaft portion 25, and the fourth shaft portion 26 may be divided into two and be formed of two axes.

Figure 3A:
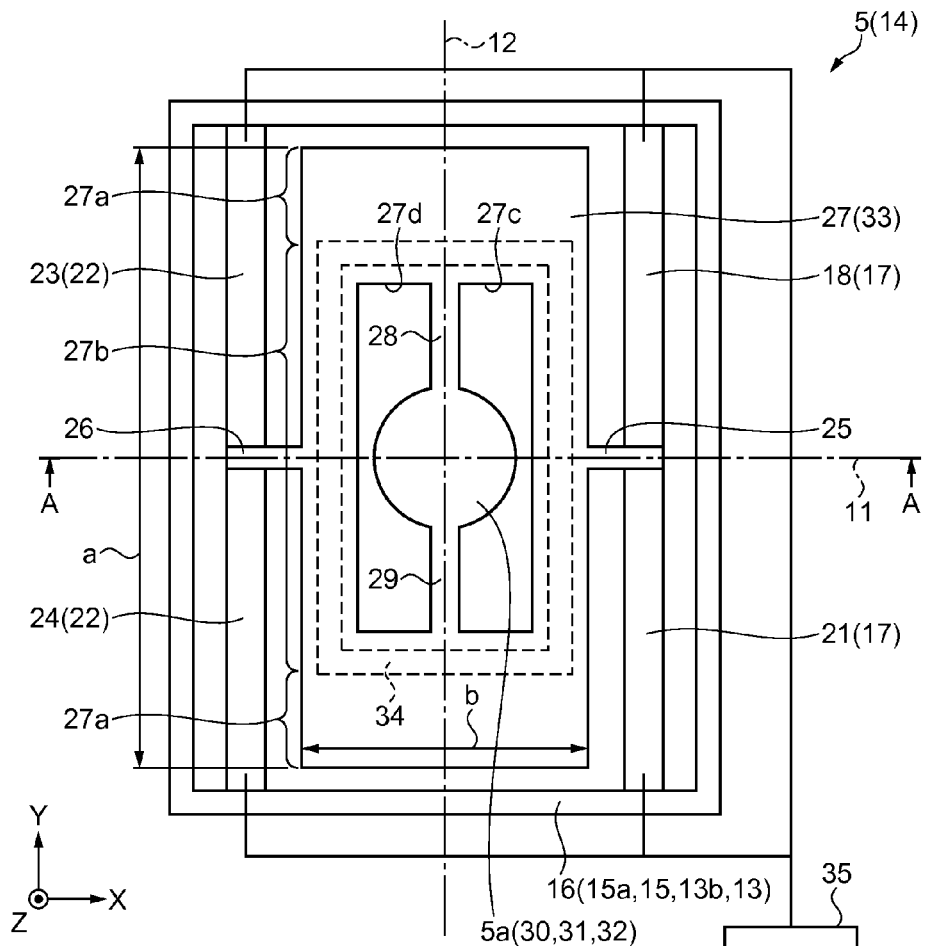
FIG. 3A is a schematic top view showing a structure of an optical scanner and FIG. 3B is a schematic cross-sectional side view showing a structure of an optical scanner.
Figure 3B:
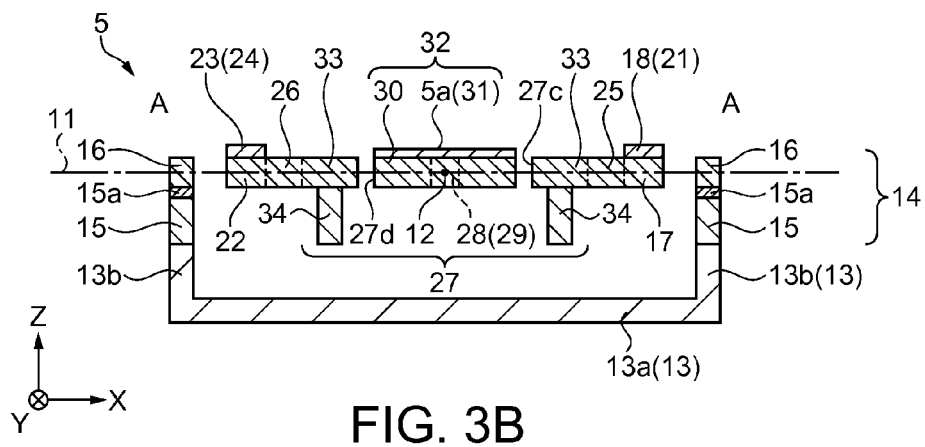

FIG. 3A is a schematic top view showing a structure of the optical scanner and FIG. 3B is a schematic cross-sectional side view showing a structure of the optical scanner. FIG. 3B shows a cross section taken along line A-A of FIG. 3A. As shown in FIGS. 3A and 3B, a reflection film 31 as a light reflection unit is installed on the surface of the movable plate 30 facing the Z direction, and a part of the drawing laser light beam 3 emitted to the reflection film 31 is reflected by the reflection surface 5a which is a surface of the reflection film 31. A reflector 32 as a light reflection unit is configured with the reflection surface 5a, the movable plate 30, and the reflection film 31.

The displacement portion 27 is configured with a plate-shaped member 33 and a square tubular portion 34. The square tubular portion 34 is positioned on the negative Z direction side of the plate-shaped member 33 and has a square tubular shape. The square tubular portion 34 is a reinforcing rib which reinforces the strength of the displacement portion 27. A part of the displacement portion 27 positioned on the Y direction side of the square tubular portion 34 is set as a thin plate structure portion 27a as a damper portion. A part of the displacement portion 27 positioned on the negative Y direction side of the square tubular portion 34 is also set as the thin plate structure portion 27a. Accordingly, the thin plate structure portion 27a, a frame portion 27b, and the thin plate structure portion 27a are disposed in this order on the displacement portion 27 in the Y direction. The thin plate structure portion 27a is configured with a part of the plate-shaped member 33. A part including the square tubular portion 34 and positioned inside of the square tubular portion 34 is set as the frame portion 27b. The frame portion 27b is configured with a part of the plate-shaped member 33 and the square tubular portion 34. The square tubular portion 34 has a shape to be protruded in the negative Z direction with respect to the thin plate structure portion 27a. A thickness of the thin plate structure portion 27a is a thickness of the plate-shaped member 33, and a thickness of the frame portion 27b is a thickness obtained by adding a thickness of the square tubular portion 34 to the thickness of the plate-shaped member 33. Accordingly, the thin plate structure portion 27a has a small thickness and the frame portion 27b has a great thickness.

A length of the displacement portion 27 in a direction along the vertical axis 12 is greater than a length thereof in a direction along the horizontal axis 11. That is, when a length of the displacement portion 27 in a direction along the vertical axis 12 is set as a and a length of the displacement portion 27 in a direction along the horizontal axis 11 is set as b, a relationship of a>b is satisfied. Accordingly, it is possible to suppress a length of the optical scanner 5 in a direction along the horizontal axis 11, while securing a length necessary for the first shaft portion 28 and the second shaft portion 29. It is possible to easily respond to the oscillation of the displacement portion 27 using the horizontal axis 11 as a rotation axis with respect to a low frequency, and to easily respond to the oscillation of the displacement portion 27 using the vertical axis 12 as a rotation axis with respect to a high frequency.

The optical scanner 5 includes a voltage applying unit 35, and the voltage applying unit 35 is connected to the first actuator 18, the second actuator 21, the third actuator 23, and the fourth actuator 24. The first beam portion 17 is curved by applying the voltage to the first actuator 18 and the second actuator 21 by the voltage applying unit 35. In the same manner as described above, the second beam portion 22 is curved by applying the voltage to the third actuator 23 and the fourth actuator 24 by the voltage applying unit 35. The first actuator 18, the second actuator 21, the third actuator 23, the fourth actuator 24, and the voltage applying unit 35 configure a driving unit which drives the first vibration system and the second vibration system described above.

The supporting portion 16, the first beam portion 17, the second beam portion 22, the third shaft portion 25, the fourth shaft portion 26, the plate-shaped member 33, the first shaft portion 28, the second shaft portion 29, and the movable plate 30 are integrally formed on a first Si layer (device layer). The portions described above, the square tubular portion 34, and the supporting frame portion 15 are formed by etching an SOI substrate obtained by laminating the first Si layer (device layer), an oxide film 15a (box layer), and a second Si layer (handle layer) in this order. The square tubular portion 34 and the supporting frame portion 15 are formed from the second Si layer. Fine processing can be performed on the SOI substrate by etching. Since the supporting portion 16, the first beam portion 17, the second beam portion 22, the third shaft portion 25, the fourth shaft portion 26, the plate-shaped member 33, the first shaft portion 28, the second shaft portion 29, the movable plate 30, the square tubular portion 34, and the supporting frame portion 15 are formed by using the SOI substrate, it is possible to obtain excellent dimensional accuracy of these portions. Accordingly, it is possible to obtain excellent vibration properties of the first vibration system and the second vibration system.

The supporting frame portion 15 is disposed on the bottom plate 13a side of the supporting portion 16. The supporting frame portion 15 increases the strength of the supporting portion 16. The supporting frame portion 15 surrounds the square tubular portion 34 in the X and Y directions. Accordingly, when an operator grasps the structure 14, it is possible to prevent stress applied to the third shaft portion 25 and the fourth shaft portion 26 by grasping the supporting frame portion 15.

The dimension of each member is not particularly limited, but in the embodiment, a dimension of each portion is set to the following value, for example. A length of the housing 13 in the X direction is 5000 μm, and a length thereof in the Y direction is 6000 μm. A height of the housing 13 is 1000 μm, and a thickness of the bottom plate 13a of the housing 13 is 500 μm. A length of the optical scanner 5 in the Z direction is from 1295 μm to 1300 μm. A height of the supporting frame portion 15 and the square tubular portion 34 is 250 μm and a height of the supporting portion 16 is 40 μm. A thickness of the first actuator 18 to the fourth actuator 24 is from 5 μm to 10 μm.

A length of the plate-shaped member 33 in the X direction is 2500 μm, a length thereof in the Y direction is 3500 μm. A thickness of the plate-shaped member 33 is 40 μm. A length of the first hole 27c and the second hole 27d in the Y direction is 2000 μm. A length from an edge of the square tubular portion 34 on the Y direction side to an edge of the displacement portion 27 on the Y direction side is 750 μm. A diameter of the movable plate 30 is 1000 μm.

Figure 4:
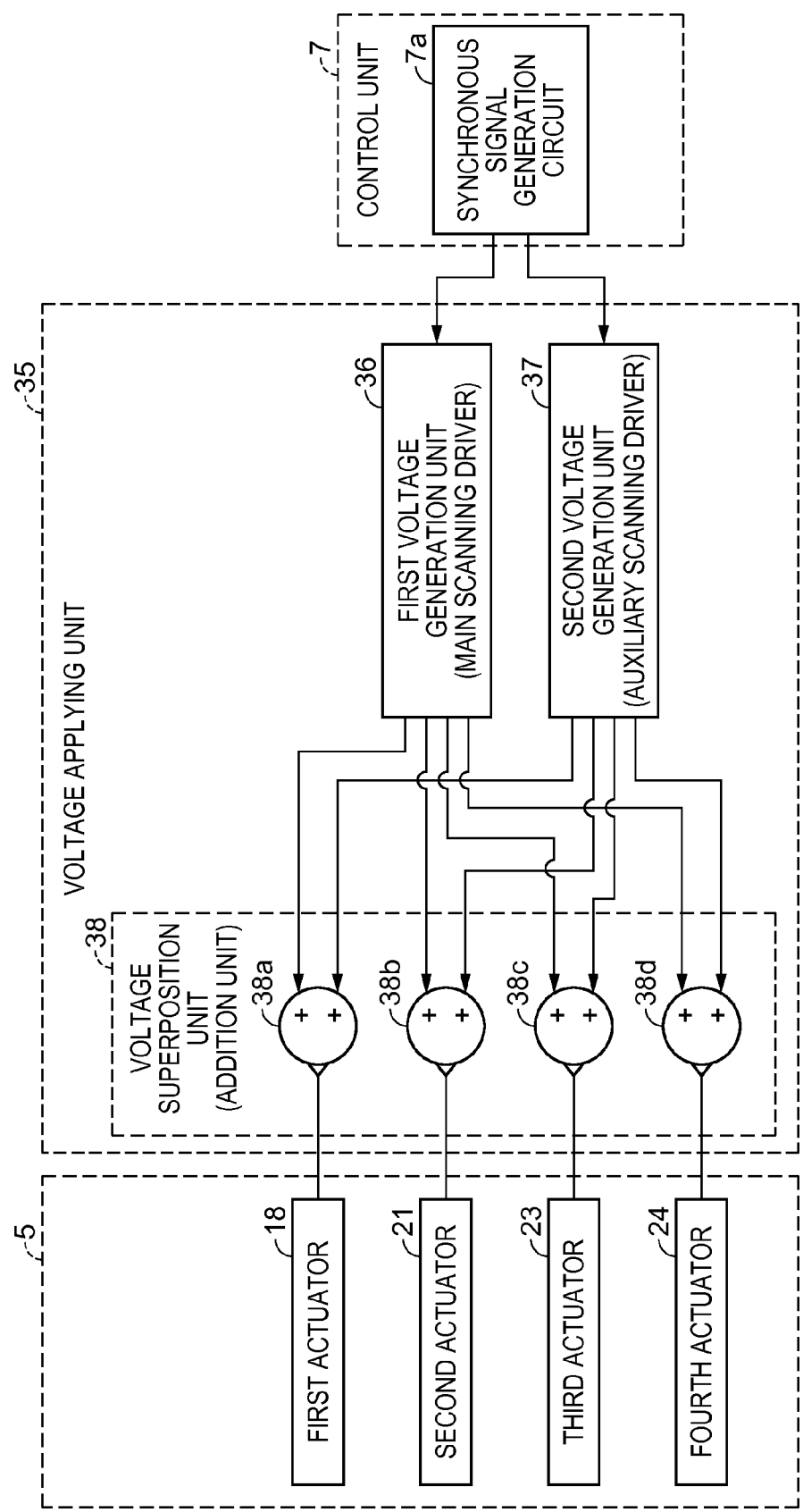
FIG. 4 is an electrical block diagram showing a configuration of a voltage applying unit.

FIG. 4 is an electrical block diagram showing a configuration of the voltage applying unit. As shown in FIG. 4, the voltage applying unit 35 includes a first voltage generation unit 36 which generates a main scanning voltage waveform for oscillating the movable plate 30 by using the vertical axis 12 as a rotation axis. The first voltage generation unit 36 outputs four voltage waveforms which are a first main scanning voltage waveform to a fourth main scanning voltage waveform. The voltage applying unit 35 includes a second voltage generation unit 37 which generates an auxiliary scanning voltage waveform for oscillating the movable plate 30 by using the horizontal axis 11 as a rotation axis. The second voltage generation unit 37 outputs four voltage waveforms which are a first auxiliary scanning voltage waveform to a fourth auxiliary scanning voltage waveform. The voltage applying unit 35 includes a voltage superposition unit 38 which superposes the main scanning voltage waveform and the auxiliary scanning voltage waveform. The first voltage generation unit 36 outputs the main scanning voltage waveform to the voltage superposition unit 38 and the second voltage generation unit 37 outputs the auxiliary scanning voltage waveform to the voltage superposition unit 38.

The voltage superposition unit 38 includes a first voltage superposition unit 38a, a second voltage superposition unit 38b, a third voltage superposition unit 38c, and a fourth voltage superposition unit 38d. Each of the first voltage superposition unit 38a to the fourth voltage superposition unit 38d is connected to the first voltage generation unit 36 and the second voltage generation unit 37. The first voltage superposition unit 38a is connected to the first actuator 18, and the second voltage superposition unit 38b is connected to the second actuator 21. The third voltage superposition unit 38c is connected to the third actuator 23, and the fourth voltage superposition unit 38d is connected to the fourth actuator 24.

The first voltage superposition unit 38a superposes the first main scanning voltage waveform and the first auxiliary scanning voltage waveform onto each other, and the superposed voltage is output to the first actuator 18. The second voltage superposition unit 38b superposes the second main scanning voltage waveform and the second auxiliary scanning voltage waveform onto each other, and the superposed voltage is output to the second actuator 21. The third voltage superposition unit 38c superposes the third main scanning voltage waveform and the third auxiliary scanning voltage waveform onto each other, and the superposed voltage is output to the third actuator 23. The fourth voltage superposition unit 38d superposes the fourth main scanning voltage waveform and the fourth auxiliary scanning voltage waveform onto each other, and the superposed voltage is output to the fourth actuator 24.

The voltage applying unit 35 is connected to the control unit 7. The control unit 7 includes a synchronous signal generation circuit 7a, and the synchronous signal generation circuit 7a outputs a synchronous signal to the first voltage generation unit 36 and the second voltage generation unit 37. The first voltage generation unit 36 outputs the main scanning voltage waveform and the second voltage generation unit 37 outputs the auxiliary scanning voltage waveform based on the synchronous signal. Accordingly, the main scanning voltage waveform and the auxiliary scanning voltage waveform become synchronized signals.

Figure 5A:
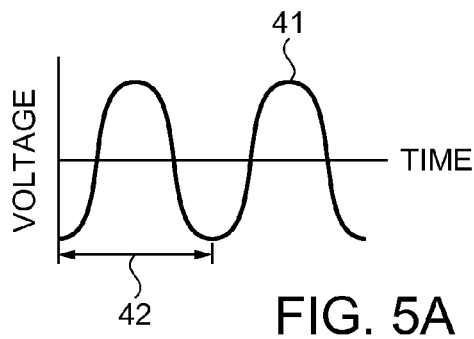
FIGS. 5A to 5H are diagrams illustrating main scanning voltage waveforms and auxiliary scanning voltage waveforms.

FIGS. 5A to 5H are diagrams illustrating the main scanning voltage waveforms and the auxiliary scanning voltage waveforms. In FIGS. 5A to 5H, a vertical axis indicates a voltage and a horizontal axis indicates elapsed time. FIG. 5A is a diagram illustrating the first main scanning voltage waveform. A first main scanning voltage waveform 41 indicates a waveform of a voltage output to the first voltage superposition unit 38a by the first voltage generation unit 36. The first main scanning voltage waveform 41 is a waveform of a voltage which drives the first actuator 18 for the main scanning of the reflection surface 5a. The first main scanning voltage waveform 41 forms a waveform such as a sine wave which periodically changes in a first period 42. A frequency of the first main scanning voltage waveform 41 is, for example, preferably 18 kHz to 30 kHz. In the embodiment, the frequency of the first main scanning voltage waveform 41 is, for example, set to be equivalent to a torsional resonance frequency (f1) of the first vibration system configured with the movable plate 30, the first shaft portion 28, and the second shaft portion 29. Accordingly, it is possible to increase an oscillation angle of the movable plate 30 by using the vertical axis 12 as a rotation axis. Alternatively, it is possible to suppress power used for oscillating the movable plate 30.

Figure 5B:
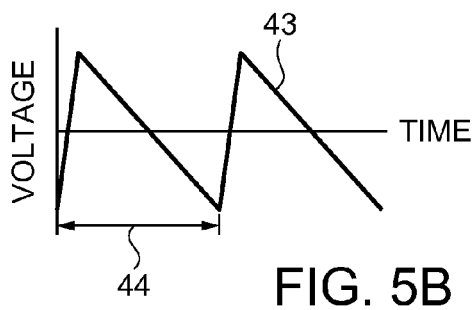

FIG. 5B is a diagram illustrating the first auxiliary scanning voltage waveform. A first auxiliary scanning voltage waveform 43 indicates a waveform of a voltage output to the first voltage superposition unit 38a by the second voltage generation unit 37. The first auxiliary scanning voltage waveform 43 is a waveform of a voltage which drives the first actuator 18 for the auxiliary scanning of the reflection surface 5a. The first auxiliary scanning voltage waveform 43 forms a waveform such as a saw-tooth wave which periodically changes in a second period 44 which is longer than the first period 42. A frequency of the first auxiliary scanning voltage waveform 43 is lower than the frequency of the first main scanning voltage waveform 41, and is, for example, preferably 60 Hz to 120 Hz. As described above, the frequency of the first auxiliary scanning voltage waveform 43 is set to be smaller than the frequency of the first main scanning voltage waveform 41. Accordingly, it is possible to oscillate the movable plate 30 at the frequency of the first main scanning voltage waveform 41 by using the vertical axis 12 as a rotation axis and to oscillate the movable plate 30 at the frequency of the first auxiliary scanning voltage waveform 43 by using the horizontal axis 11 as a rotation axis, in a more reliable and smooth manner. The first voltage superposition unit 38a outputs the voltage waveform obtained by superposing the first main scanning voltage waveform 41 and the first auxiliary scanning voltage waveform 43 onto each other, to the first actuator 18.

When a torsional resonance frequency of the first vibration system is set as f1 [Hz] and a torsional resonance frequency of the second vibration system is set as f2 [Hz], it is preferable that f1 and f2 satisfy a relationship of f2 <f1. Accordingly, it is possible to oscillate the movable plate 30 at the frequency of the first main scanning voltage waveform 41 by using the vertical axis 12 as a rotation axis and to oscillate the movable plate 30 at the frequency of the first auxiliary scanning voltage waveform 43 by using the horizontal axis 11 as a rotation axis, in a more smooth manner.

Figure 5C:
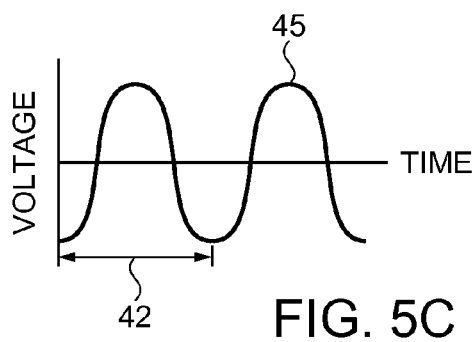

FIG. 5C is a diagram illustrating the second main scanning voltage waveform. A second main scanning voltage waveform 45 indicates a waveform of a voltage output to the second voltage superposition unit 38b by the first voltage generation unit 36. The second main scanning voltage waveform 45 is a waveform of a voltage which drives the second actuator 21 for the main scanning of the reflection surface 5a. The second main scanning voltage waveform 45 is the same waveform as the first main scanning voltage waveform 41 and has the same frequency. The voltage applying unit 35 outputs the same main scanning voltage waveform to the first actuator 18 and the second actuator 21. Accordingly, the first actuator 18 and the second actuator 21 are driven to be deformed in the same manner in the main scanning.

Figure 5D:
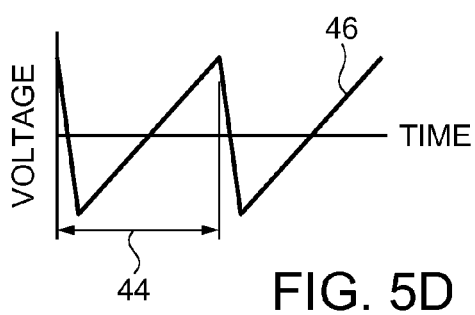

FIG. 5D is a diagram illustrating the second auxiliary scanning voltage waveform. A second auxiliary scanning voltage waveform 46 indicates a waveform of a voltage output to the second voltage superposition unit 38b by the second voltage generation unit 37. The second auxiliary scanning voltage waveform 46 is a waveform of a voltage which drives the second actuator 21 for the auxiliary scanning of the reflection surface 5a. The second auxiliary scanning voltage waveform 46 is a waveform obtained with the inversed voltage of the first auxiliary scanning voltage waveform 43, and has the same frequency. The voltage applying unit 35 outputs the auxiliary scanning voltage waveforms with the inversed voltages to the first actuator 18 and the second actuator 21. Accordingly, the first actuator 18 and the second actuator 21 are driven to have reversed uneven deformations in the auxiliary scanning. The second voltage superposition unit 38b outputs the voltage waveform obtained by superposing the second main scanning voltage waveform 45 and the second auxiliary scanning voltage waveform 46 onto each other, to the second actuator 21.

Figure 5E:
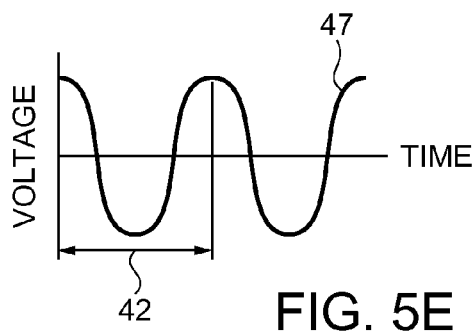

FIG. 5E is a diagram illustrating the third main scanning voltage waveform. A third main scanning voltage waveform 47 indicates a waveform of a voltage output by the first voltage generation unit 36. The third main scanning voltage waveform 47 is a waveform of a voltage which drives the third actuator 23 for the main scanning of the reflection surface 5a. The third main scanning voltage waveform 47 is a waveform obtained with the inversed voltage of the first main scanning voltage waveform 41 and has the same frequency. Accordingly, the first actuator 18 and the third actuator 23 are driven to have reversed uneven deformations in the main scanning.

Figure 5F:
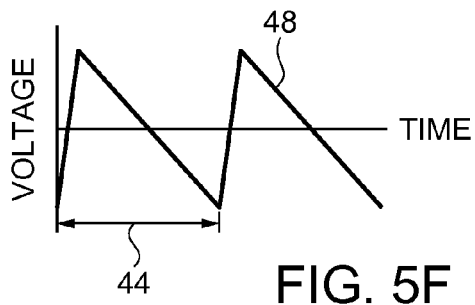

FIG. 5F is a diagram illustrating the third auxiliary scanning voltage waveform. A third auxiliary scanning voltage waveform 48 indicates a waveform of a voltage output by the second voltage generation unit 37. The third auxiliary scanning voltage waveform 48 is the same waveform as the first auxiliary scanning voltage waveform 43 and has the same frequency. Accordingly, the third actuator 23 and the first actuator 18 are driven to be deformed in the same manner in the auxiliary scanning. The third voltage superposition unit 38c outputs the voltage waveform obtained by superposing the third main scanning voltage waveform 47 and the third auxiliary scanning voltage waveform 48 onto each other, to the third actuator 23.

Figure 5G:
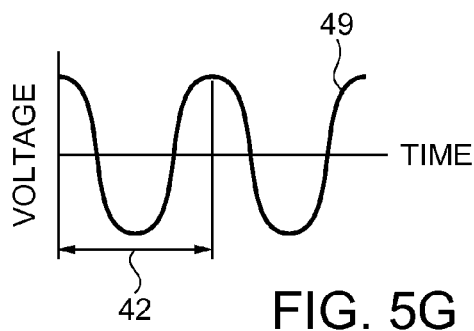

FIG. 5G is a diagram illustrating the fourth main scanning voltage waveform. A fourth main scanning voltage waveform 49 indicates a waveform of a voltage output by the first voltage generation unit 36. The fourth main scanning voltage waveform 49 is the same waveform as the third main scanning voltage waveform 47 and has the same frequency. Accordingly, the fourth actuator 24 and the third actuator 23 are driven to be deformed in the same manner in the main scanning.

Figure 5H:
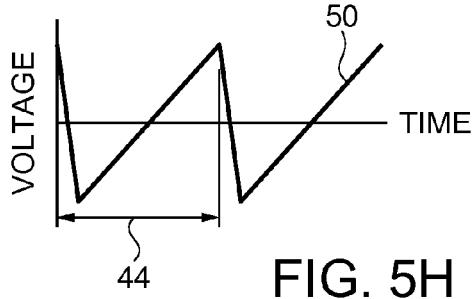

FIG. 5H is a diagram illustrating the fourth auxiliary scanning voltage waveform. A fourth auxiliary scanning voltage waveform 50 indicates a waveform of a voltage output by the second voltage generation unit 37. The fourth auxiliary scanning voltage waveform 50 is the same waveform as the second auxiliary scanning voltage waveform 46 and has the same frequency. Accordingly, the fourth actuator 24 and the third actuator 23 are driven to have reversed uneven deformations in the auxiliary scanning. The fourth voltage superposition unit 38*d* outputs the voltage waveform obtained by superposing the fourth main scanning voltage waveform 49 and the fourth auxiliary scanning voltage waveform 50 onto each other, to the fourth actuator 24.

FIG. 6A to FIG. 7D are schematic views illustrating a driving method of the optical scanner. Next, the driving method of the optical scanner 5 will be described. The frequency of the main scanning voltage waveform to which the first main scanning voltage waveform 41, the second main scanning voltage waveform 45, the third main scanning voltage waveform 47, and the fourth main scanning voltage waveform 49 belong, is set to be equivalent to the torsional resonance frequency of the first vibration system. The frequency of the auxiliary scanning voltage waveform to which the first auxiliary scanning voltage waveform 43, the second auxiliary scanning voltage waveform 46, the third auxiliary scanning waveform voltage 48, and the fourth auxiliary scanning voltage waveform 50 belong, is set to be lower than the frequency of the main scanning voltage waveform. Accordingly, the oscillation of the movable plate 30 using the vertical axis 12 as a rotation axis is easily controlled by the main scanning voltage waveform. The oscillation of the movable plate 30 using the horizontal axis 11 as a rotation axis is easily controlled by the auxiliary scanning voltage waveform.

Figure 6A:
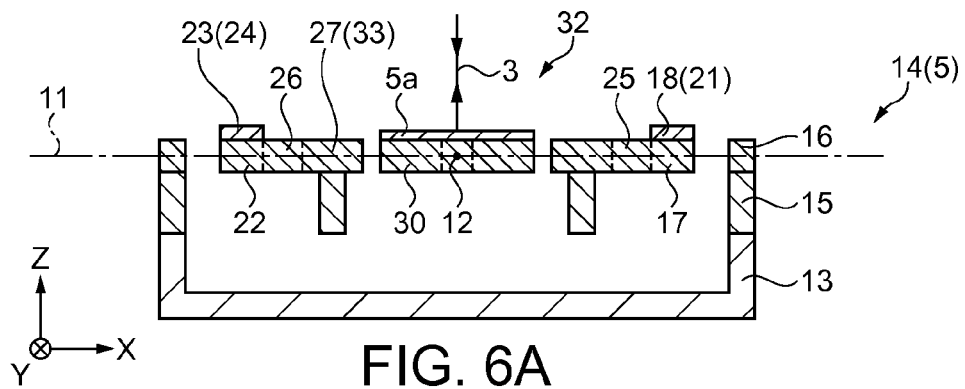
FIGS. 6A to 6D are diagrams illustrating a driving method of an optical scanner.

First, the oscillation of the movable plate 30 using the vertical axis 12 as a rotation axis will be described. As shown in FIG. 6A, when the voltage applied to the first actuator 18 to the fourth actuator 24 is 0 volts, the first actuator 18 to the fourth actuator 24 do not cause the first beam portion 17 and the second beam portion 22 to be curved. Accordingly, the first beam portion 17 and the second beam portion 22 have a straight columnar shape. The first main scanning voltage waveform 41 to the fourth main scanning voltage waveform 49 are the synchronized waveforms, and the voltage is set to 0 volts in every half period.

In the first actuator 18 to the fourth actuator 24, electrodes are installed on both surfaces of the piezoelectric element in the Z direction. The voltage applied to the first actuator 18 to the fourth actuator 24 indicates a voltage applied to the electrodes on the positive Z direction side with respect to the electrodes on the negative Z direction side of each actuator. As the voltage becomes greater, the actuator is further curved in the Z direction.

The first main scanning voltage waveform 41 and the second main scanning voltage waveform 45 are the same waveforms. Accordingly, the voltages with the same waveforms are applied to the first actuator 18 and the second actuator 21. In the embodiment, when the positive voltage is applied to the first actuator 18 and the second actuator 21, the third shaft portion 25 moves in the positive Z direction, and when the negative voltage is applied thereto, the third shaft portion 25 moves in the negative Z direction.

In the same manner as described above, the third main scanning voltage waveform 47 and the fourth main scanning voltage waveform 49 are the same waveforms. Accordingly, the voltages with the same waveforms are applied to the third actuator 23 and the fourth actuator 24. When the positive voltage is applied to the third actuator 23 and the fourth actuator 24, the fourth shaft portion 26 moves in the positive Z direction, and when the negative voltage is applied thereto, the fourth shaft portion 26 moves in the negative Z direction.

In the main scanning voltage waveforms, the first main scanning voltage waveform 41 and the second main scanning voltage waveform 45 are the same waveforms, and the third main scanning voltage waveform 47 and the fourth main scanning voltage waveform 49 are the same waveforms. The first main scanning voltage waveform 41 and the third main scanning voltage waveform 47 have the waveforms inversed from each other. Accordingly, polarities of the voltage applied to the first actuator 18 and the second actuator 21, and the voltage applied to the third actuator 23 and the fourth actuator 24 are reversed from each other.

Figure 6B:
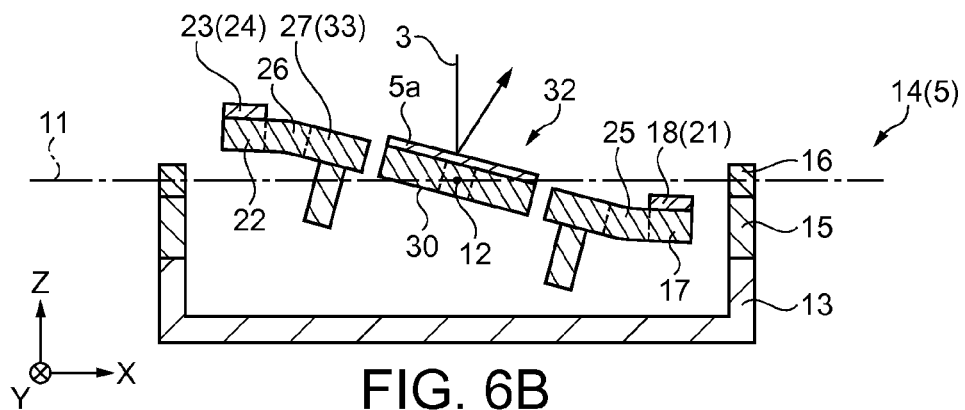

Next, as shown in FIG. 6B, the negative voltage is applied to the first actuator 18 and the second actuator 21. At that time, the positive voltage is applied to the third actuator 23 and the fourth actuator 24. The third shaft portion 25 moves in the negative Z direction and the fourth shaft portion 26 moves in the positive Z direction. Accordingly, since the displacement portion 27 and the movable plate 30 rotate around the vertical axis 12, the reflection surface 5*a* is inclined and faces the positive X direction side. The drawing laser light 3 incident to the reflection surface 5*a* moves in the positive X direction.

Figure 6C:
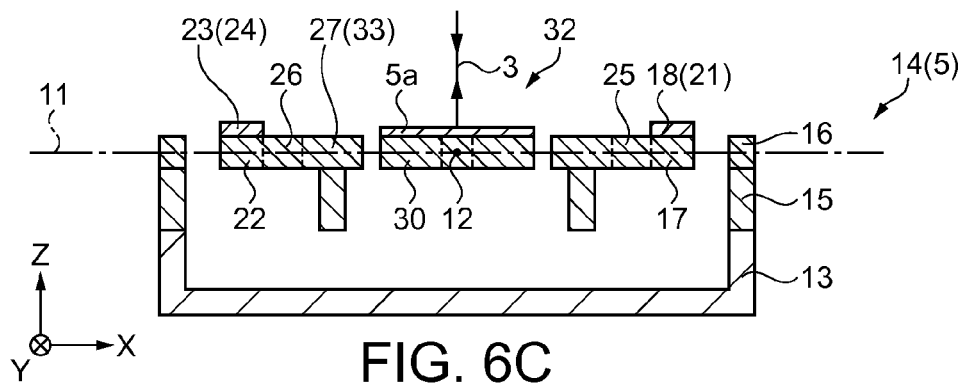

Next, as shown in FIG. 6C, the voltage of 0 volts is applied to the first actuator 18 and the second actuator 21. At that time, the voltage of 0 volts is also applied to the third actuator 23 and the fourth actuator 24. The first actuator 18 to the fourth actuator 24 do not cause the first beam portion 17 and the second beam portion 22 to be curved. Accordingly, the first beam portion 17 and the second beam portion 22 return to have a straight columnar shape. Thus, the movable plate 30 is not inclined and the reflection surface 5*a* faces the positive Z direction side. The drawing laser light incident to the reflection surface 5*a* moves in the Z direction.

Figure 6D:
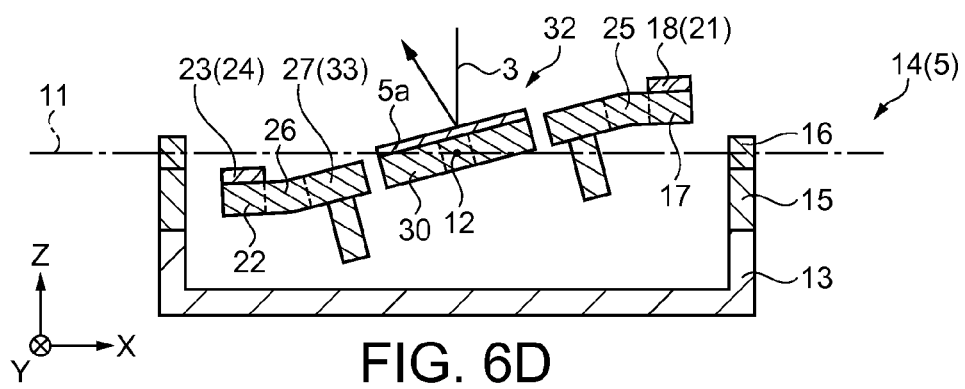

Next, as shown in FIG. 6D, the positive voltage is applied to the first actuator 18 and the second actuator 21. At that time, the negative voltage is applied to the third actuator 23 and the fourth actuator 24. The third shaft portion 25 moves in the positive Z direction and the fourth shaft portion 26 moves in the negative Z direction. Accordingly, since the displacement portion 27 and the movable plate 30 rotate around the vertical axis 12, the reflection surface 5*a* is inclined and faces the negative X direction side. The drawing laser light 3 incident to the reflection surface 5*a* moves in the negative X direction.

Since the first main scanning voltage waveform 41 to the fourth main scanning voltage waveform 49 are periodic waveforms, the state of the optical scanner 5 transitions to the states shown in FIG. 6A, FIG. 6B, FIG. 6C, and FIG. 6D in this order, and returns to the state shown in FIG. 6A and repeatedly transitions to the states shown in FIGS. 6A to 6D. Accordingly, the movable plate 30 oscillates by using the vertical axis 12 as a rotation axis and the drawing laser light 3 is scanned in the X direction. Since the frequency of the main scanning voltage waveform is equivalent to the torsional resonance frequency of the first vibration system, the first actuator 18 to the fourth actuator 24 can cause the movable plate 30 to greatly oscillate by the resonance vibration.

Next, the oscillation of the movable plate 30 using the horizontal axis 11 as a rotation axis will be described. In the auxiliary scanning voltage waveforms, the first auxiliary scanning voltage waveform 43 and the third auxiliary scanning voltage waveform 48 are the same waveforms, and the second auxiliary scanning voltage waveform 46 and the fourth auxiliary scanning voltage waveform 50 are the same waveforms. The first auxiliary scanning voltage waveform 43 and the second auxiliary scanning voltage waveform 46 have the waveforms inversed from each other.

Figure 7A:
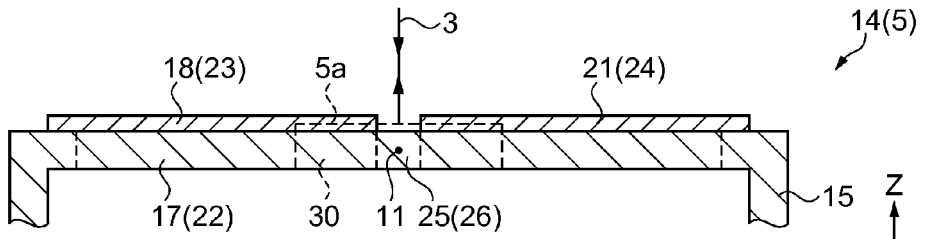
FIGS. 7A to 7D are diagrams illustrating a driving method of an optical scanner.

As shown in FIG. 7A, when the voltage applied to the first actuator 18 to the fourth actuator 24 is 0 volts, the first actuator 18 to the fourth actuator 24 do not cause the first beam portion 17 and the second beam portion 22 to be curved.

Accordingly, the first beam portion 17 and the second beam portion 22 have a straight columnar shape. At that time, since the reflection surface 5a faces the Z direction side, the drawing laser light 3 incident to the reflection surface 5a moves in the Z direction. The first auxiliary scanning voltage waveform 43 to the fourth auxiliary scanning voltage waveform 50 are the synchronized waveforms, and the voltage is set to 0 volts in every half period.

Figure 7B:
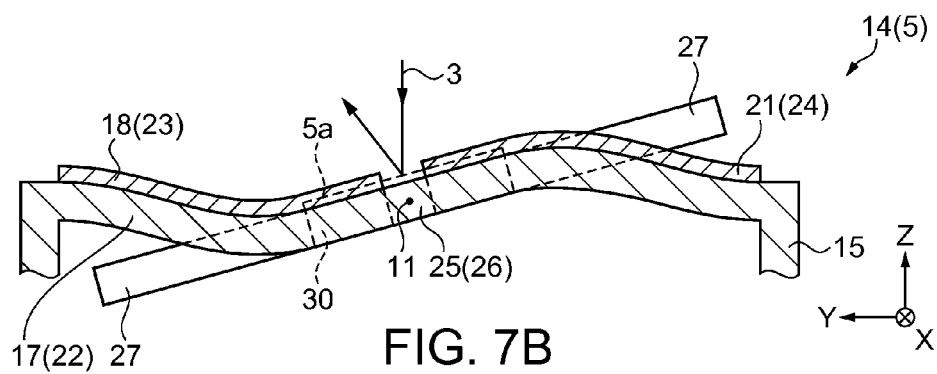

Next, as shown in FIG. 7B, the negative voltage is applied to the first actuator 18 and the third actuator 23. The positive voltage is applied to the second actuator 21 and the fourth actuator 24. The first beam portion 17 and the second beam portion 22 are curved so that the Y direction sides thereof are protruded in the negative Z direction and the negative Y direction sides thereof are protruded in the Z direction. Accordingly, the third shaft portion 25 and the fourth shaft portion 26 rotate counterclockwise by using the horizontal axis 11 as a rotation axis. Since the displacement portion 27 and the movable plate 30 face the Y direction side, the reflection surface 5a is also inclined to face the Y direction side. The drawing laser light 3 incident to the reflection surface 5a moves in the Y direction.

Figure 7C:
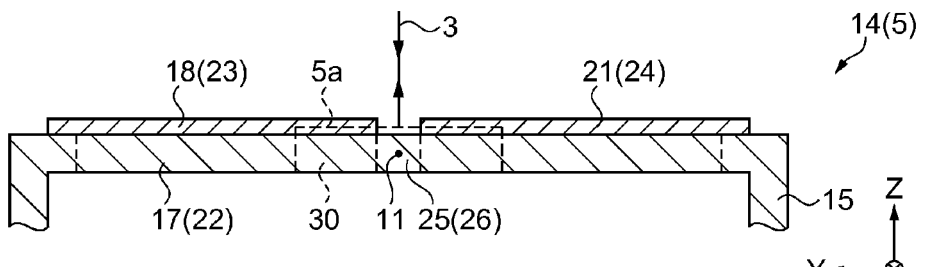

Next, as shown in FIG. 7C, the voltage of 0 volts is applied to the first actuator 18 and the third actuator 23. At that time, the voltage of 0 volts is also applied to the second actuator 21 and the fourth actuator 24. The first actuator 18 to the fourth actuator 24 do not cause the first beam portion 17 and the second beam portion 22 to be curved. Accordingly, the first beam portion 17 and the second beam portion 22 return to have a straight columnar shape. Thus, the movable plate 30 is not inclined and the reflection surface 5a faces the Z direction side. The drawing laser light 3 incident to the reflection surface 5a moves in the Z direction.

Figure 7D:
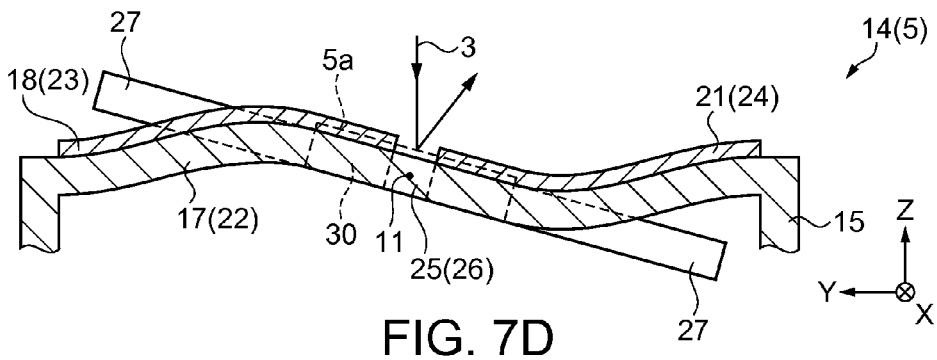

Next, as shown in FIG. 7D, the positive voltage is applied to the first actuator 18 and the third actuator 23. At that time, the negative voltage is applied to the second actuator 21 and the fourth actuator 24. The first beam portion 17 and the second beam portion 22 are curved so that the Y direction sides thereof are protruded in the positive Z direction and the negative Y direction sides thereof are protruded in the negative Z direction. Accordingly, the third shaft portion 25 and the fourth shaft portion 26 rotate clockwise by using the horizontal axis 11 as a rotation axis. Since the displacement portion 27 and the movable plate 30 face the negative Y direction side, the reflection surface 5a is also inclined to face the negative Y direction side. The drawing laser light 3 incident to the reflection surface 5a moves in the negative Y direction.

Since the auxiliary scanning voltage waveforms of the first auxiliary scanning voltage waveform 43 to the fourth auxiliary scanning voltage waveform 50 are periodic waveforms, the state of the optical scanner 5 transitions to the states shown in FIG. 7A, FIG. 7B, FIG. 7C, and FIG. 7D in this order, and returns to the state shown in FIG. 7A and repeatedly transitions to the states shown in FIGS. 7A to 7D. Accordingly, the movable plate 30 oscillates by using the horizontal axis 11 as a rotation axis and the drawing laser light 3 is scanned in the Y direction.

The frequency of the auxiliary scanning voltage waveforms is set to be extremely lower than the frequency of the main scanning voltage waveforms. The torsional resonance frequency of the second vibration system is set to be even lower than the torsional resonance frequency of the first vibration system. Accordingly, the oscillation of the movable plate 30 at the frequency of the auxiliary scanning voltage waveforms by using the vertical axis 12 as a rotation axis is suppressed.

As described above, in the optical scanner 5, the voltage applying unit 35 outputs the main scanning voltage waveforms and the auxiliary scanning voltage waveforms to the first actuator 18 to the fourth actuator 24. Accordingly, the movable plate 30 is oscillated at the frequency of the main scanning voltage waveforms by using the vertical axis 12 as a rotation axis, and the movable plate 30 is oscillated at the frequency of the auxiliary scanning voltage waveforms by using the horizontal axis 11 as a rotation axis. Since the movable plate 30 is oscillated around two axes which are the horizontal axis 11 and the vertical axis 12, the drawing laser light 3 reflected by the reflection film 31 is two-dimensionally scanned.

The control unit 7 has a function of controlling the operations of the drawing light source unit 4 and the optical scanner 5. In detail, the control unit 7 drives the optical scanner 5 so as to cause the movable plate 30 to oscillate by using the horizontal axis 11 and the vertical axis 12 as rotation axes. In addition, the control unit 7 synchronizes the light with the oscillation of the movable plate 30, and emits the drawing laser light 3 from the drawing light source unit 4. The control unit 7 includes an interface (not shown), and the control unit 7 inputs image data transmitted from an external computer through the interface. The control unit 7 emits the laser light beams 3r, 3g, and 3b with a predetermined intensity from the laser light sources 8r, 8g, and 8b at a predetermined timing based on the image data. Accordingly, the optical scanner 5 emits the drawing laser light 3 with a predetermined color and light intensity at a predetermined timing. Thus, an image corresponding to the image data is displayed on the screen 2.

Figure 8A:
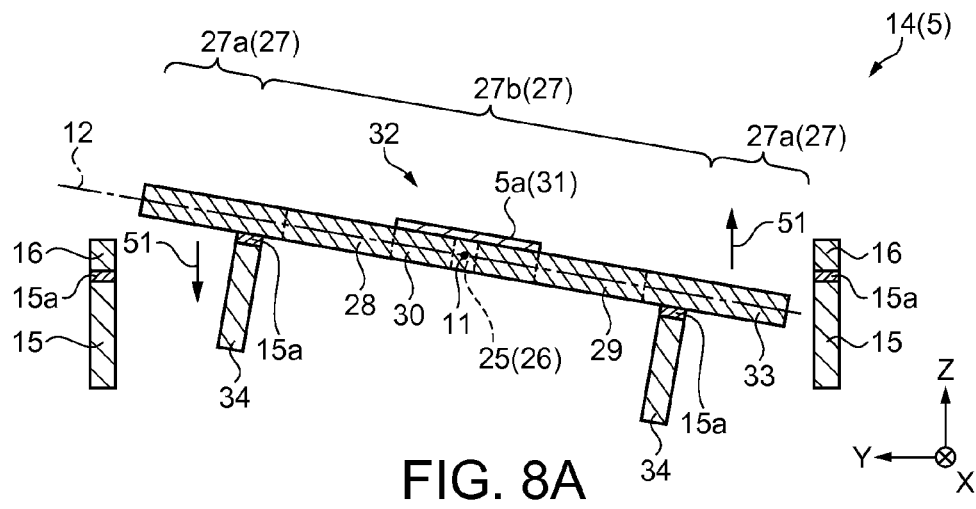
FIGS. 8A to 8C are schematic views illustrating operations of a displacement portion.
Figure 8B:
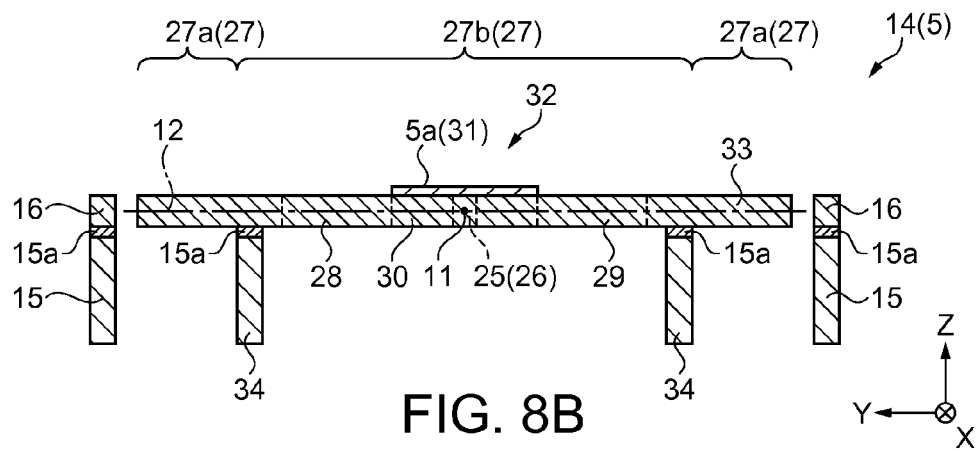
Figure 8C:
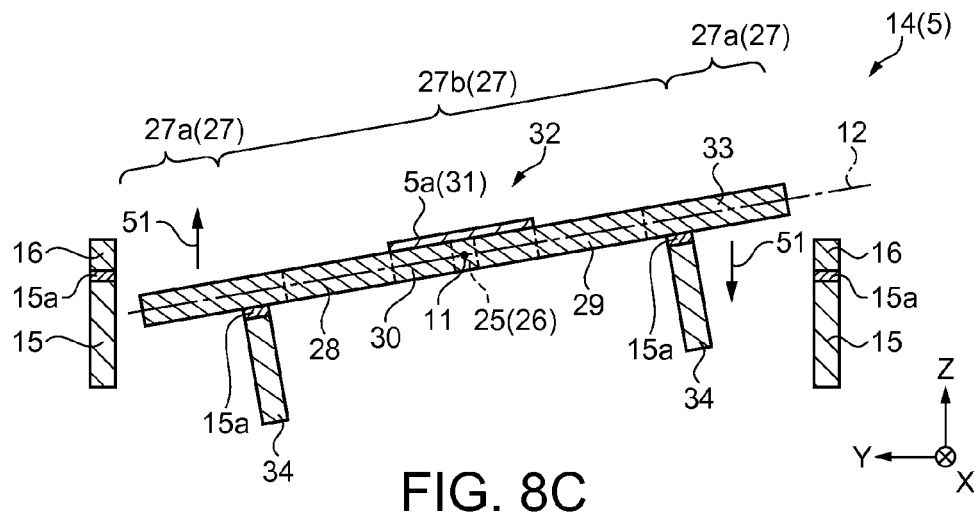

FIGS. 8A to 8C are schematic views illustrating operations of the displacement portion. FIG. 8A is a diagram when the displacement portion 27 is rotated clockwise by using the horizontal axis 11 as a rotation axis. FIG. 8B is a diagram when the displacement portion 27 is horizontal. FIG. 8C is a diagram when the displacement portion 27 is rotated counterclockwise by using the horizontal axis 11 as a rotation axis.

The voltage applying unit 35 is electrically connected to the first actuator 18 to the fourth actuator 24, and the displacement portion 27 is driven by the auxiliary scanning voltage waveforms. The displacement portion 27 oscillates by using the third shaft portion 25 and the fourth shaft portion 26 as rotation axes so as to repeat the states shown in FIG. 8A, FIG. 8B, FIG. 8C, FIG. 8B, and FIG. 8A in this order.

One end of each of the first shaft portion 28 and the second shaft portion 29 supports the movable plate 30 and the other end of each of the first shaft portion 28 and the second shaft portion 29 is connected to the displacement portion 27. The displacement portion 27 is supported by the third shaft portion 25 and the fourth shaft portion 26. A direction in which the first shaft portion 28 and the second shaft portion 29 extend, and a direction in which the third shaft portion 25 and the fourth shaft portion 26 extend are orthogonal to each other. The movable plate 30 oscillates around the vertical axis 12, and the displacement portion 27 oscillates around the horizontal axis 11. Accordingly, the movable plate 30 oscillates around axes in two directions orthogonal to each other.

The displacement portion 27 includes the thin plate structure portion 27a and the frame portion 27b. The frame portion 27b is positioned to be close to the third shaft portion 25 and the fourth shaft portion 26, and the thin plate structure portion 27a is positioned at a location separated from the third shaft portion 25 and the fourth shaft portion 26. Since the square tubular portion 34 is not installed in the thin plate structure portion 27a, the thin plate structure portion 27a is thinner than the frame portion 27b. The inertia moment of the displacement portion 27 of the optical scanner 5 is decreased, compared to when the thickness of the thin plate structure portion 27a is the same as the thickness of the frame portion 27b. As the inertia moment of the displacement portion becomes small, the power consumed for driving the displacement portion 27 can be reduced. Accordingly, it is possible to reduce the power consumed for driving the optical scanner 5.

When the displacement portion 27 oscillates by using the horizontal axis 11 as a rotation axis, an air current 51 is generated around the displacement portion 27. The thin plate structure portion 27a functions as a damper which attenuates the rotation rate by the air current 51. Resistance of the oscillation of the displacement portion 27 becomes great with respect to the component with a high frequency. Accordingly, it is possible to set the displacement portion 27 to hardly react with respect to the driving of the main scanning voltage waveforms having a high frequency. Thus, it is possible to set the oscillation of the movable plate 30 using the horizontal axis 11 as a rotation axis to be hardly affected by the driving of the main scanning voltage waveforms having a high frequency. As a result, it is possible to improve the vibration performance of the movable plate 30. That is, the movable plate 30 can oscillate by using the vertical axis 12 as an axis in accordance with the main scanning voltage waveforms, and the displacement portion 27 and the movable plate 30 can oscillate by using the horizontal axis 11 as an axis in accordance with the auxiliary scanning voltage waveforms. When the movable plate 30 oscillates around the horizontal axis 11, the displacement portion 27 can be oscillated so as not to be affected by the main scanning voltage waveforms.

Figure 9A:
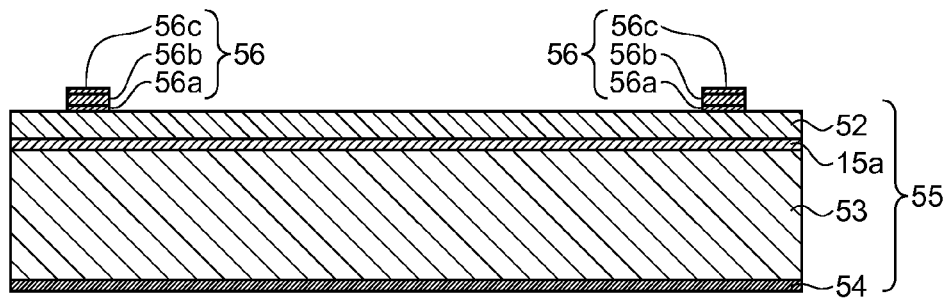
FIGS. 9A to 9D are schematic views illustrating a manufacturing method of an optical scanner.

FIGS. 9A to 10C are schematic views illustrating a manufacturing method of the optical scanner. Next, the manufacturing method of the optical scanner 5 will be described with reference to FIGS. 9A to 10C. First, the structure 14 is manufactured. As shown in FIG. 9A, a laminated substrate 55 in which a first silicon layer 52, the oxide film 15a, a second silicon layer 53, and a mask oxide film 54 from the top of the drawing are laminated on each other is prepared. The oxide film 15a and the mask oxide film 54 are formed of silicon dioxide, and can be formed by oxidizing the second silicon layer 53. A thickness of each layer is not particularly limited, but in the embodiment, for example, a thickness of the first silicon layer 52 is set to be approximately 40 µm, a thickness of the oxide film 15a is set to be approximately 0.5 µm, a thickness of the second silicon layer 53 is set to be approximately 250 µm, and a thickness of the mask oxide film 54 is set to be approximately 0.5 µm.

Next, an actuator 56 which is the first actuator 18 to the fourth actuator 24 is formed on the laminated substrate 55. In the actuator 56, a first metal layer 56a, a pyroelectric layer 56b, and a second metal layer 56c are laminated on each other in this order. In the first metal layer 56a, layers of iridium, iridium oxide, and platinum are laminated on each other in this order from the first silicon layer 52 side. Iridium has a function of orientation control, iridium oxide has a function of a reducing gas barrier, and platinum has a function as a seed layer. The first metal layer 56a is formed by forming a film by a sputtering method and patterning, for example. Hereinafter, the patterning is performed by using photolithography and an etching method.

Lead zirconate titanate (PZT) or PZTN obtained by adding Nb (niobium) to PZT can be used as the material of the pyroelectric layer 56b. The pyroelectric layer 56b is, for example, formed by patterning after forming a film by the sputtering method and a sol-gel method.

A material of the second metal layer 56c may be metal having excellent conductivity and metal having heat resistance is preferable. In the embodiment, for example, as the material of the second metal layer 56c, the layers of platinum, iridium oxide, and iridium are laminated in this order from the pyroelectric layer 56b side. Platinum has a function of orientation adjustment, iridium oxide has a function of a reducing gas barrier, and iridium has a function as a low resistance layer. The materials of the first metal layer 56a and the second metal layer 56c are not limited to the examples described above, but metal such as gold, copper, iron, aluminum, zinc, chromium, lead, or titanium, or alloy such as nichrome may be used. The second metal layer 56c is formed by forming a film by a sputtering method and patterning, for example. Next, the pyroelectric layer 56b is heated. A temperature at which the pyroelectric layer 56b is heated is not particularly limited, but in the embodiment, the pyroelectric layer 56b is heated at approximately 400° C. By heating PZT, crystals grow.

Figure 9B:
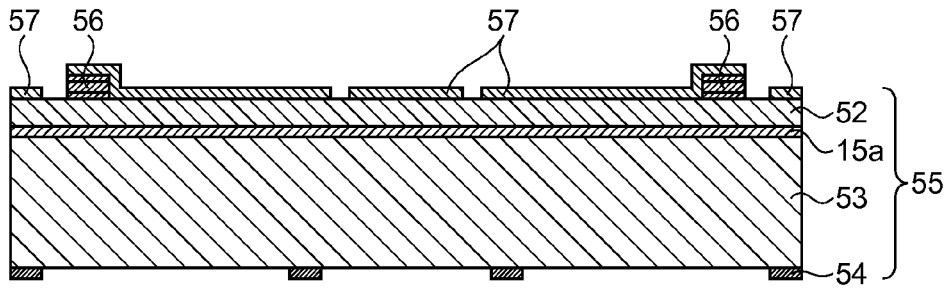

Next, as shown in FIG. 9B, a resist layer 57 is formed by laminating the first silicon layer 52 and the actuator 56 on each other. The resist layer 57 is formed by coating and drying the material of the resist layer 57 by a spin coating method and a dipping method. Next, the resist layer 57 and the mask oxide film 54 are patterned. The resist layer 57 is patterned in the shape of the movable plate 30, the first shaft portion 28, the second shaft portion 29, the plate-shaped member 33, the third shaft portion 25, the fourth shaft portion 26, the first beam portion 17, the second beam portion 22, and the supporting portion 16. The mask oxide film 54 is patterned to the shape of the supporting frame portion 15 and the square tubular portion 34.

Figure 9C:
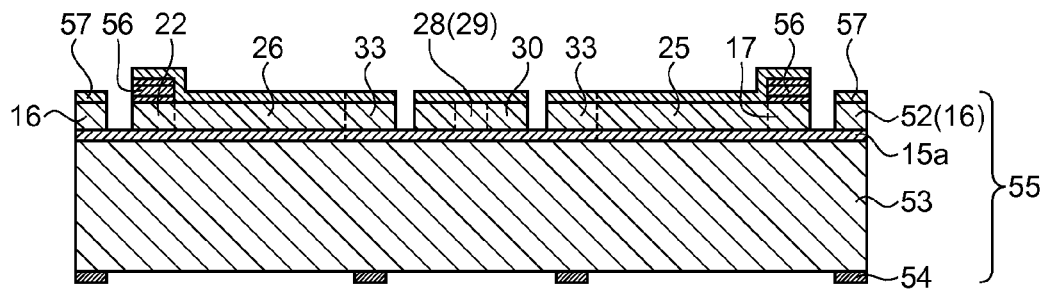

Next, as shown in FIG. 9C, the first silicon layer 52 is subjected to dry etching by using the resist layer 57 as a mask. The movable plate 30, the first shaft portion 28, the second shaft portion 29, the plate-shaped member 33, the third shaft portion 25, the fourth shaft portion 26, the first beam portion 17, the second beam portion 22, and the supporting portion 16 are formed by this etching.

Figure 9D:
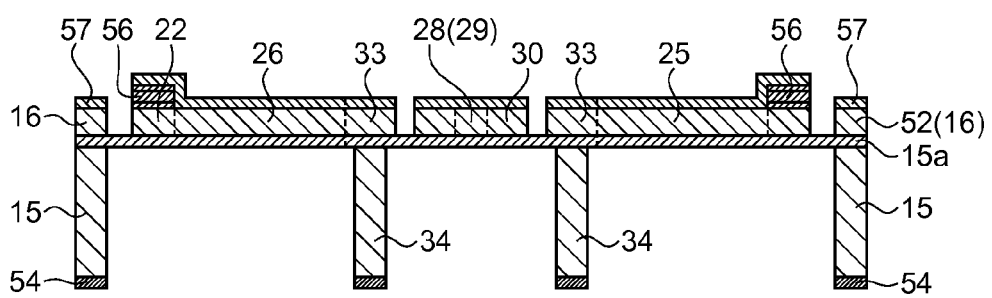
Figure 10A:
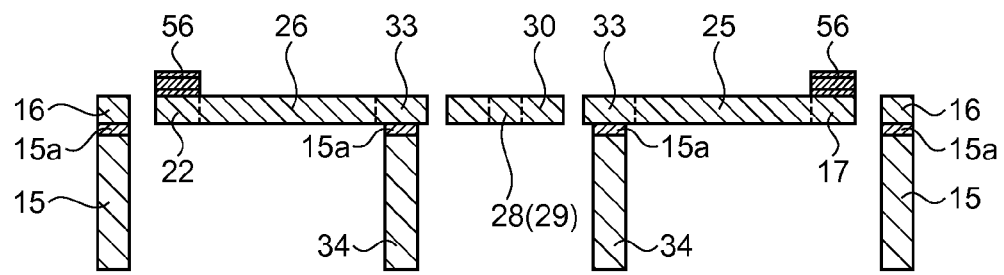
FIGS. 10A to 10C are schematic views illustrating a manufacturing method of an optical scanner.

Next, as shown in FIG. 9D, the second silicon layer 53 is subjected to etching by an etching method such as dry etching, for example. At that time, the mask oxide film 54 is used as a mask. The supporting frame portion 15 and the square tubular portion 34 are formed. Next, as shown in FIG. 10A, an exposed part of the oxide film 15a and the mask oxide film 54 are etched and removed. In addition, the resist layer 57 is peeled off and removed.

Figure 10B:
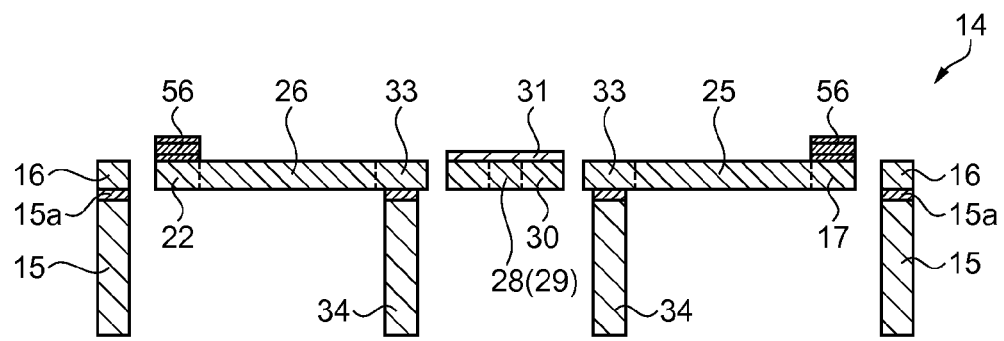

Next, as shown in FIG. 10B, the reflection film 31 is formed on the movable plate 30. The material of the reflection film 31 is formed by a method such as vapor deposition and sputtering. The movable plate 30 may be polished to set a mirror surface, before forming the reflection film 31. Accordingly, the drawing laser light 3 can be reflected at an angle with excellent precision. A step of polishing the movable plate 30 to set a mirror surface is not particularly limited, and it is preferable to perform the step before installing the resist layer 57. It is possible to polish the movable plate 30 without damaging the first shaft portion 28 and the second shaft portion 29.

When forming the plurality of structures 14 on one silicon wafer, the structures 14 are cut by a method such as dicing. As described above, the structure 14 is obtained.

Figure 10C:
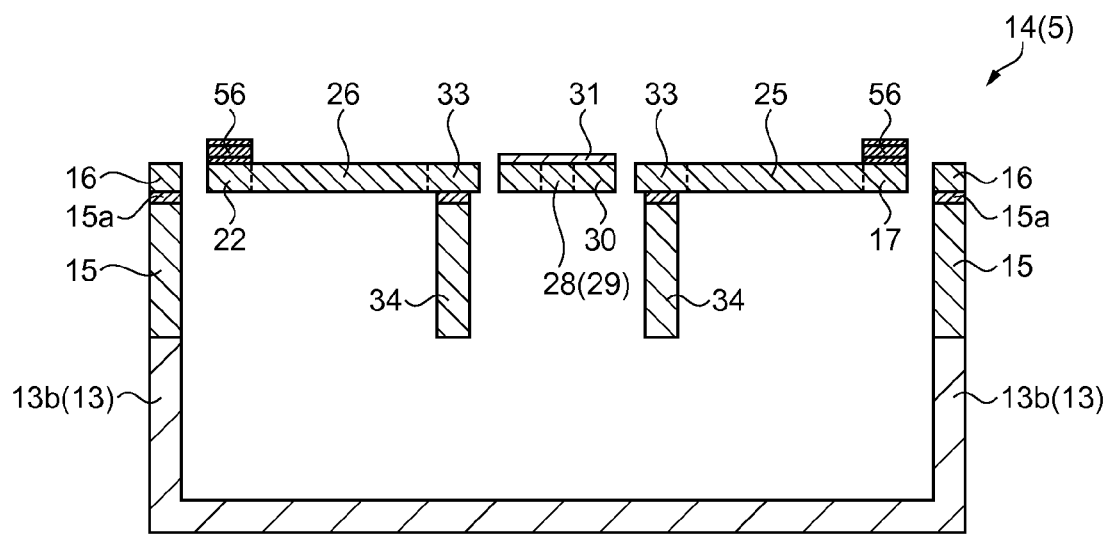

Next, as shown in FIG. 10C, the housing 13 is prepared. The supporting frame portion 15 and the side plate 13b are laminated and adhered to each other. As described above, the optical scanner 5 is completed.

As described above, according to the embodiment, the following effects are obtained.

(1) According to the embodiment, the displacement portion 27 includes the frame portion 27b and the thin plate structure portion 27a. The frame portion 27b maintains a relative position of the first shaft portion 28 and the second shaft portion 29. The thin plate structure portion 27a extends in a direction intersecting with a direction in which the third shaft portion 25 and the fourth shaft portion 26 extend, from the frame portion 27b. When the displacement portion 27 oscillates around the horizontal axis 11, the thin plate structure portion 27a functions as a damper by generating the air current 51 around the thin plate structure portion. Accordingly, it is possible to set the displacement portion 27 to hardly react with respect to the driving with the high frequency. Thus, when the reflector 32 oscillates around the horizontal axis 11, it is possible to set the reflector 32 to hardly react with respect to the driving with the high frequency. As a result, it is possible to improve the vibration performance of the reflector 32.

(2) According to the embodiment, the lengths of the displacement portion 27 in the two directions intersecting with each other are different from each other. When the length of the displacement portion 27 in a direction along the vertical axis 12 is set as a and the length of the displacement portion 27 in a direction along the horizontal axis 11 is set as b, a relationship of a>b is satisfied. Accordingly, when the displacement portion 27 oscillates around the horizontal axis 11, a movement amount of the thin plate structure portion 27a increases, compared to when the displacement portion 27 oscillates around the vertical axis 12. Accordingly, when the displacement portion 27 oscillates around the horizontal axis 11, resistance increases, compared to when the displacement portion 27 oscillates around the vertical axis 12. It is possible to set the oscillation of the displacement portion 27 to hardly react around the horizontal axis 11 with respect to the driving with the high frequency.

Second Embodiment

Figure 11A:
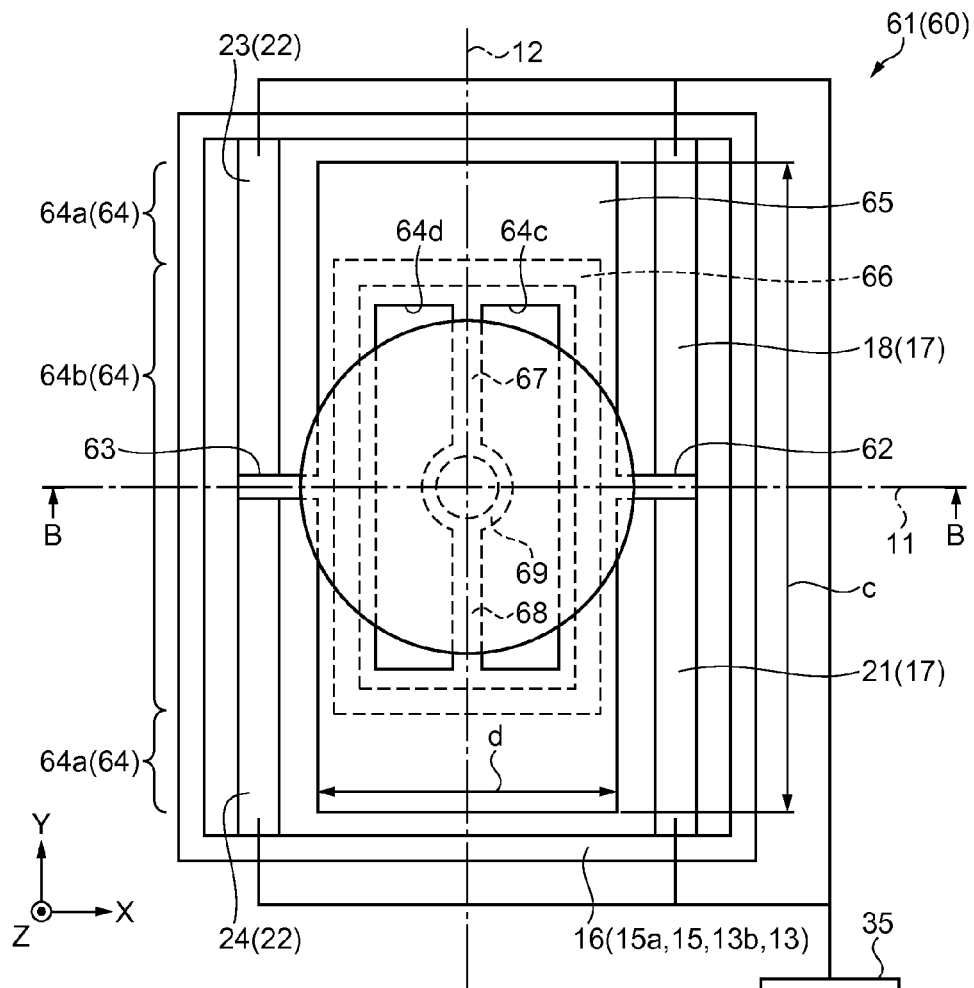
Figure 11B:
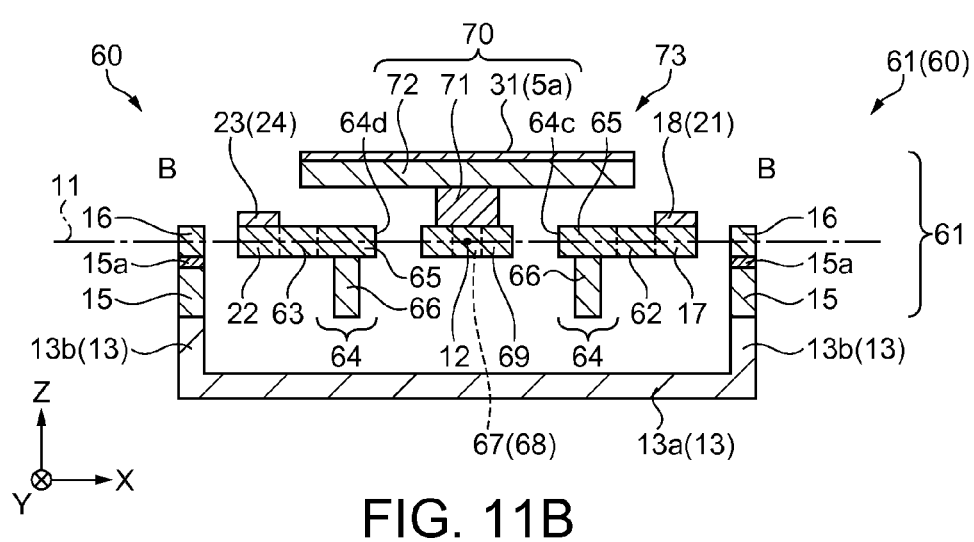

Next, one embodiment of an optical scanner will be described with reference to FIG. 11A showing a schematic plan view showing a structure of an optical scanner and FIG. 11B showing a schematic cross-sectional side view showing a structure of an optical scanner. FIG. 11B is a cross-sectional view taken along line B-B of FIG. 11A. The shape of the reflector 32 of the embodiment is different from that of the first embodiment. The description of the same points as the first embodiment will be omitted.

That is, in the embodiment, as shown in FIGS. 11A and 11B, an optical scanner 60 includes a structure 61. The structure 61 is installed on the side plate 13b of the housing 13. The structure 61 is installed on the side plate 13b by laminating the supporting frame portion 15, the oxide film 15a, and the supporting portion 16 in a square tubular shape.

The first beam portion 17 and the second beam portion 22 which extend in the Y direction are installed on the supporting portion 16. The first actuator 18 and the second actuator 21 are installed on the first beam portion 17. The third actuator 23 and the fourth actuator 24 are installed on the second beam portion 22. A third shaft portion 62 is installed on the first beam portion 17 along the horizontal axis 11, and a fourth shaft portion 63 is installed on the second beam portion 22 along the horizontal axis 11.

A displacement portion 64 is installed between the third shaft portion 62 and the fourth shaft portion 63. The displacement portion 64 has a square frame shape and is a rectangle having long sides in the Y direction. A length of the displacement portion 64 in the X direction is shorter than the length of the displacement portion 27 of the first embodiment. A length of the displacement portion 64 in the Y direction is shorter than the length of the displacement portion 27 of the first embodiment. The length of the displacement portion 64 in a direction along the vertical axis 12 is set as c, and the length of the displacement portion 64 in a direction along the horizontal axis 11 is set as d. At that time, a relationship of c>d is satisfied.

The displacement portion 64 is configured with a plate-shaped member 65 and a square tubular portion 66. A part of the displacement portion 64 positioned on the Y direction side of the square tubular portion 66 is set as a thin plate structure portion 64a. A part of the displacement portion 64 positioned on the negative Y direction side of the square tubular portion 66 is also set as the thin plate structure portion 64a. A part including the square tubular portion 66 in the Y direction and positioned inside of the square tubular portion 66 is set as a frame portion 64b. The frame portion 64b is configured with a part of the plate-shaped member 65 and the square tubular portion 66, and the thin plate structure portion 64a is configured with a part of the plate-shaped member 65. Accordingly, a thickness of the thin plate structure portion 64a is thinner than a thickness of the frame portion 64b.

A first shaft portion 67 and a second shaft portion 68 as first torsion bars which extend in the Y direction are installed along the vertical axis 12 at the center of the displacement portion 64 in the X direction. A movable plate 69 is installed between the first shaft portion 67 and the second shaft portion 68. The movable plate 69 has a disc shape, and a size of the movable plate 69 is smaller than that of the movable plate 30 of the first embodiment. Accordingly, lengths of the plate-shaped member 65 and the displacement portion 64 in the X direction can be set to be small.

A light reflection unit 70 is installed on the movable plate 69. The light reflection unit 70 includes a support 71 and a reflection plate 72. The support 71 is installed on the movable plate 69 and the reflection plate 72 is installed on the support 71. The reflection film 31 is installed on the surface of the reflection plate 72 on the Z direction side, and the surface of the reflection plate 72 on the Z direction side is set as the reflection surface 5a. The reflection plate 72 and the displacement portion 64 are installed at an interval in the Z direction, and in a plan view seen from the Z direction side, a part of the reflection plate 72 is disposed so as to be overlapped with the displacement portion 64.

A hole positioned on the X direction side of the first shaft portion 67 and the second shaft portion 68 in the displacement portion 64 is set as a first hole 64c, and a hole positioned on the negative X direction side of the first shaft portion 67 and the second shaft portion 68 is set as a second hole 64d. The plate-shaped member 65 surrounding the first hole 64c and the second hole 64d is a part of the displacement portion 64. In a plan view seen from the Z direction side, the reflection plate 72 is protruded in the X direction with respect to the first hole 64c and is protruded in the negative X direction with respect to the second hole 64d. That is, in a plan view seen from the Z direction side, a part of the reflection plate 72 is disposed so as to be overlapped with the displacement portion 64. A diameter of the reflection plate 72 is approximately the same as that of the movable plate 30 of the first embodiment. A reflector 73 is configured with the movable plate 69 and the light reflection unit 70.

A dimension of each member is not particularly limited, but in the embodiment, a dimension of each portion is set to the following value, for example. A length of the optical scanner 60 in the X direction is 4000 μm, and a length thereof in the Y direction is 3000 μm. A height of the housing 13 is 1000 μm, and a thickness of the bottom plate 13a of the housing 13 is 500 μm. A thickness of the supporting portion 16 is 40 μm. A length of the supporting frame portion 15 and the square tubular portion 66 in the Z direction is 250 μm. A thickness of the first actuator 18 to the fourth actuator 24 is from 5 μm to 10 μm.

The length d of the displacement portion 64 in the X direction is 800 μm and the length c thereof in the Y direction is 2200 μm. A thickness of the displacement portion 64 in the Z direction is 40 μm. A length of the first hole 64c and the second hole 64d in the Y direction is 840 μm. A distance from a surface of an edge of the square tubular portion 66 on the Y direction side to a surface of an edge of the displacement portion 64 on the Y direction side is 430 μm.

The movable plate 69 has a circular shape having a diameter of 300 μm, and a thickness thereof is 40 μm. The support 71 has a cylinder shape and a diameter thereof in the cross section is 270 μm. A diameter of the reflection plate 72 is from 800 μm to 1000 μm and a thickness of the reflection plate 72 is 40 μm.

Even when the light reflection unit 70 is installed on the displacement portion 64, the thin plate structure portion 64a functions as a damper. Accordingly, when the displacement portion 64 oscillates around the horizontal axis 11, it is possible to set the displacement portion 64 to hardly react with respect to the driving with the high frequency. As a result, it is possible to improve the vibration performance of the reflector 73.

As described above, according to the embodiment, the following effects are obtained.

(1) According to the embodiment, the reflection plate 72 and the displacement portion 64 are installed at an interval in the Z direction. In a plan view seen from the Z direction side, the reflection plate 72 is overlapped with the displacement portion 64. In this configuration, a length of the displacement portion 64 in the X direction can be set to be small, compared to when the reflection plate 72 and the displacement portion 64 are positioned on the same plane. Accordingly, it is possible to provide the miniaturized optical scanner 60.

Third Embodiment

Figure 12A:
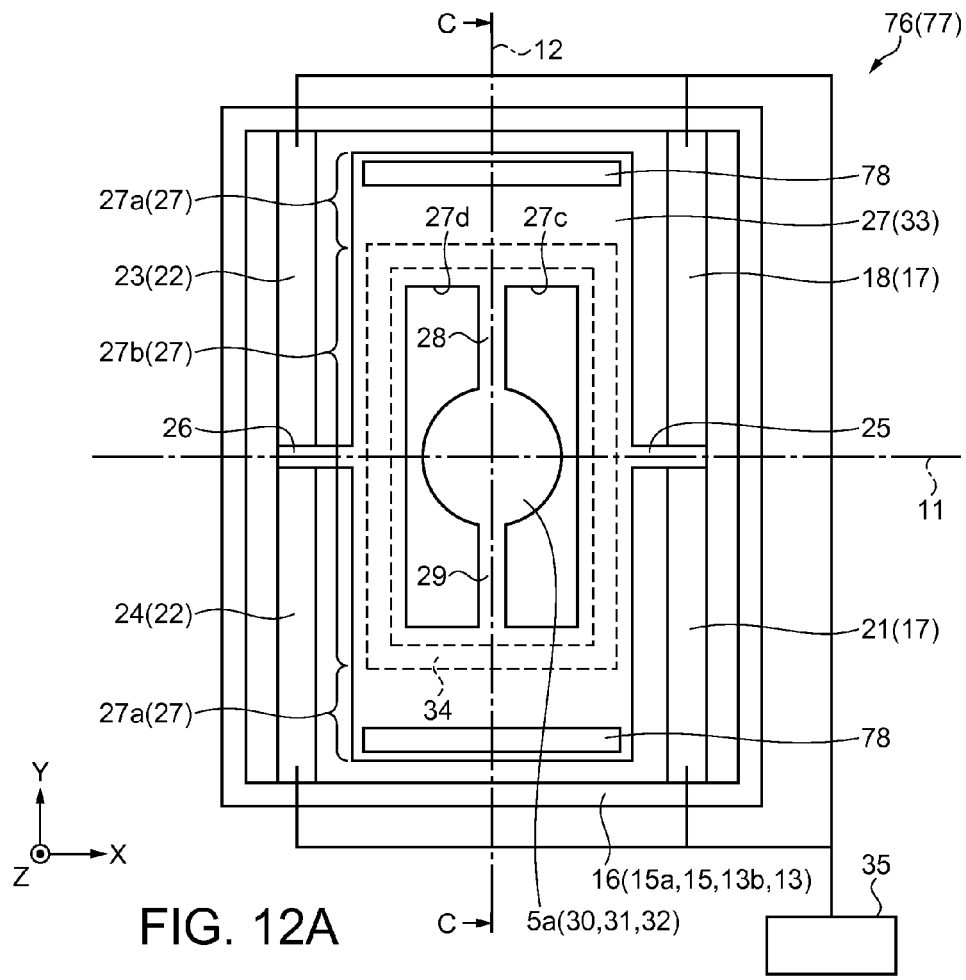
Figure 12B:
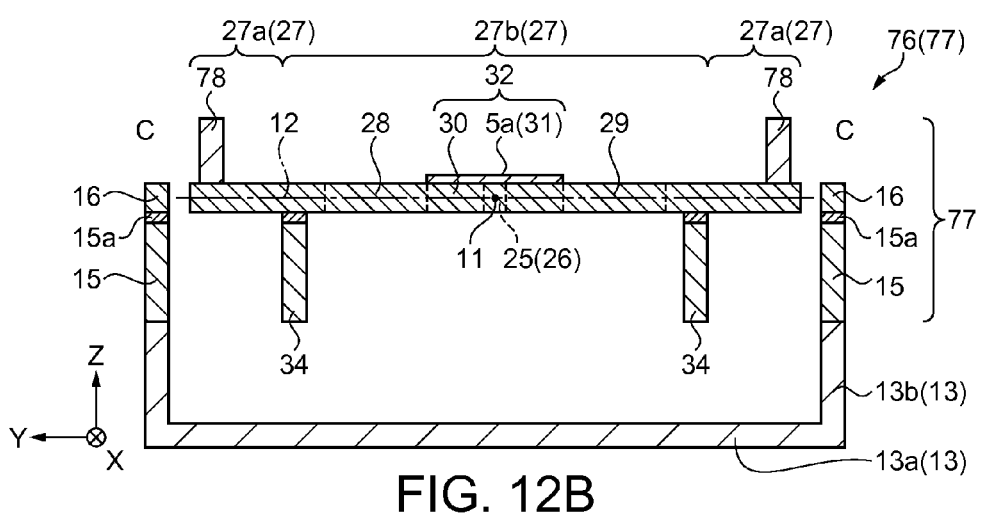

Next, one embodiment of an optical scanner will be described with reference to FIG. 12A showing a schematic plan view showing a structure of an optical scanner and FIG. 12B showing a schematic cross-sectional side view showing a structure of an optical scanner. FIG. 12B is a cross-sectional view taken along line C-C of FIG. 12A. Installation of weights on both ends of the displacement portion 27 of the embodiment is different from that of the first embodiment. The description of the same points as the first embodiment will be omitted.

That is, in the embodiment, as shown in FIGS. 12A and 12B, in a structure 77 of an optical scanner 76, weight portions 78 are installed on an end of the positive Y direction side and an end of the negative Y direction side of the thin plate structure portion 27a. Since a thickness of the weight portion 78 is added to the thickness of the plate-shaped member 33, the thickness of the thin plate structure portion 27a at the position where the weight portion 78 is installed is increased. That is, the thin plate structure portion 27a becomes thicker at the position separated from the third shaft portion 25 and the fourth shaft portion 26 than the position close to the shaft portions.

It is possible to increase the inertia moment of the displacement portion 27 around the horizontal axis 11, compared to when the thickness of the thin plate structure portion 27a separated from the horizontal axis 11 is thin. Accordingly, it is possible to set the displacement portion 27 to hardly react with respect to the driving with the high frequency. Thus, when the movable plate 30 oscillates around the horizontal axis 11, it is possible to set the movable plate 30 to hardly react with respect to the driving with the high frequency. As a result, it is possible to improve the vibration performance of the movable plate 30.

The location of the thin plate structure portion 27a where the weight portion 78 is installed is installed on the surface opposite the side where the square tubular portion 34 is installed in the displacement portion 27. That is, the weight portion 78 is installed on the Z direction side of the displacement portion 27. The Z direction is a direction in which the frame portion 27b is protruded with respect to the thin plate structure portion 27a by the square tubular portion 34. At that time, compared to a structure in which the side where the square tubular portion 34 is installed is the same as the side where the weight portion 78 is installed, a gravity center of the displacement portion 27 can be set to be close to the shafts of the third shaft portion 25 and the fourth shaft portion 26 as the second torsion bars. Accordingly, it is possible to reduce combined stress due to the torsion stress and bending stress applied to the second torsion bars, and to increase reliability with respect to the destruction of the torsion bars.

A dimension of the weight portion 78 is not particularly limited, but in the embodiment, the dimension of the weight portion 78 is set to the following value, for example. A width of the weight portion 78 is from 50 μm to 100 μm and a length thereof in the Z direction is from 200 μm to 300 μm.

Fourth Embodiment

Figure 13A:
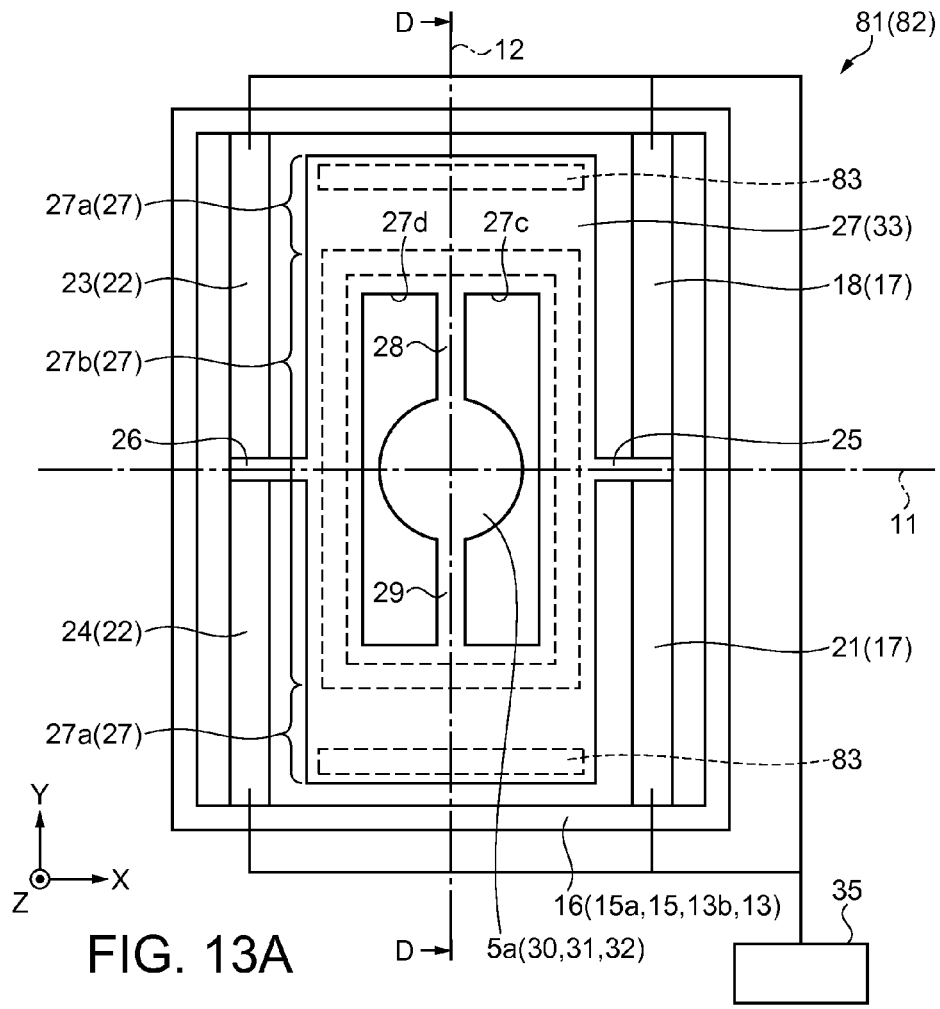
Figure 13B:
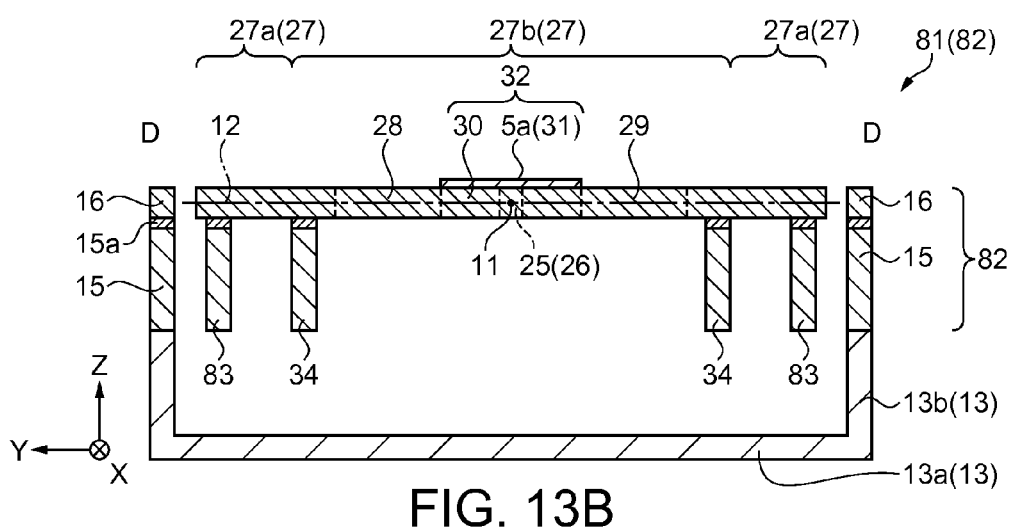

Next, one embodiment of an optical scanner will be described with reference to FIG. 13A showing a schematic plan view showing a structure of an optical scanner and FIG. 13B showing a schematic cross-sectional side view showing a structure of an optical scanner. FIG. 13B is a cross-sectional view taken along line D-D of FIG. 13A. The surface of the displacement portion 27 where the weight portion 78 is installed of the embodiment is different from that of the third embodiment. The description of the same points as the third embodiment will be omitted.

That is, in the embodiment, as shown in FIGS. 13A and 13B, in a structure 82 of an optical scanner 81, weight portions 83 are installed on an end of the positive Y direction side and an end of the negative Y direction side of the thin plate structure portion 27a. The location of the thin plate structure portion 27a where the weight portion 83 is installed is installed on the same surface as the side where the square tubular portion 34 is installed in the displacement portion 27. That is, the weight portion 83 is installed on the negative Z direction side. Lengths of the supporting frame portion 15, the square tubular portion 34, and the weight portion 83 are the same length, and the portions thereof have the same materials.

Accordingly, the supporting frame portion 15, the square tubular portion 34, and the weight portion 83 are formed by etching in the same step. Thus, it is possible to have a structure which is easy to manufacture for the optical scanner 81.

A dimension of the weight portion 83 is not particularly limited, but in the embodiment, the dimension of the weight portion 83 is set to the following value, for example. A width of the weight portion 83 is from 50 μm to 100 μm and a length thereof in the Z direction is 250 μm.

In this structure, it is possible to increase the inertia moment of the displacement portion 27 around the horizontal axis 11, compared to when the thickness of the thin plate structure portion 27a separated from the horizontal axis 11 is thin. Accordingly, it is possible to set the displacement portion 27 to hardly react with respect to the driving with the high frequency. Thus, when the movable plate 30 oscillates around the horizontal axis 11, it is possible to set the movable plate 30 to hardly react with respect to the driving with the high frequency. As a result, it is possible to improve the vibration performance of the movable plate 30.

Fifth Embodiment

Next, one embodiment of a heads-up display using the optical scanner will be described with reference to FIG. 14. The image display device 1 of the first embodiment is used in the heads-up display of the embodiment. The description of the same points as the first embodiment will be omitted.

Figure 14:
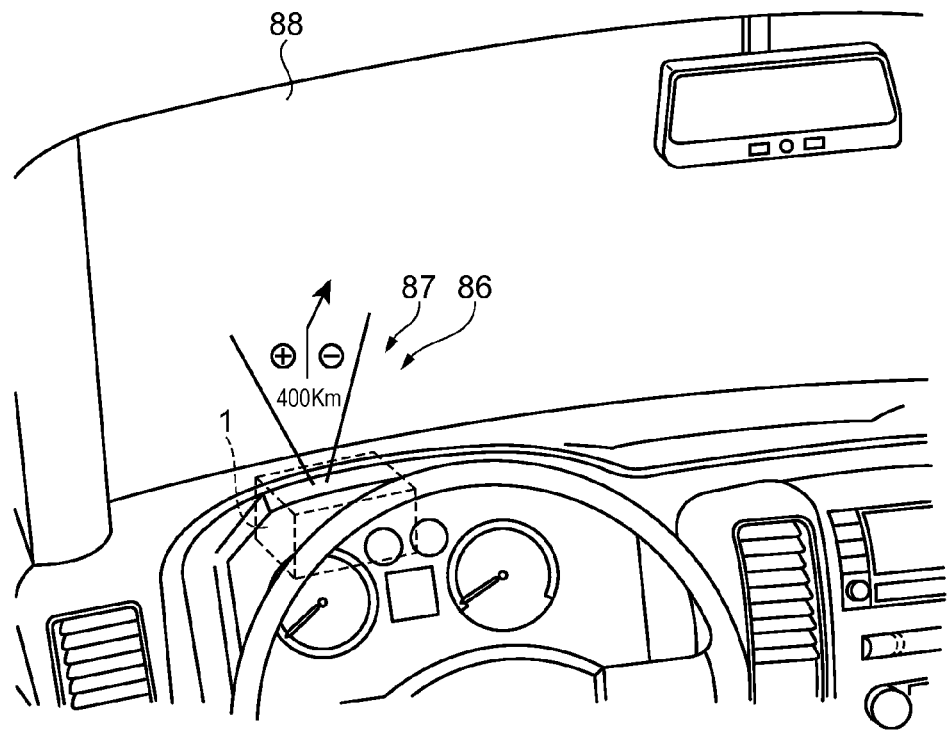
FIG. 14 is a schematic perspective view showing a heads-up display according to a fifth embodiment.

FIG. 14 is a schematic perspective view showing the heads-up display. As shown in FIG. 14, in a heads-up display system 86, the image display device 1 is mounted on a dashboard of a vehicle so as to configure a heads-up display 87. With this heads-up display 87, it is possible to display a predetermined image such as a guide display to a destination, for example, on a windshield 88. The heads-up display system 86 is not limited to a vehicle, and an airplane or a ship can be used, for example.

The drawing light source unit 4 and the optical scanner 5 are installed in the image display device 1. In the optical scanner 5 installed in the image display device 1, the thin plate structure portion 27a functions as a damper with the air current 51 generated around the thin plate structure portion. Accordingly, it is possible to set the oscillation of the displacement portion 27 around the horizontal axis 11 to hardly react with respect to the driving with the high frequency. Thus, when the reflection surface 5a oscillates around the horizontal axis 11, it is possible to set the reflection surface 5a to hardly react with respect to the driving with the high frequency. As a result, the heads-up display system 86 can include the optical scanner 5 having excellent vibration performance and an image which is easy for a viewer to see can be displayed.

Sixth Embodiment

Next, one embodiment of a head mount display using the optical scanner will be described with reference to FIG. 15. The image display device 1 of the first embodiment is used in the head mount display of the embodiment. The description of the same points as the first embodiment will be omitted.

Figure 15:
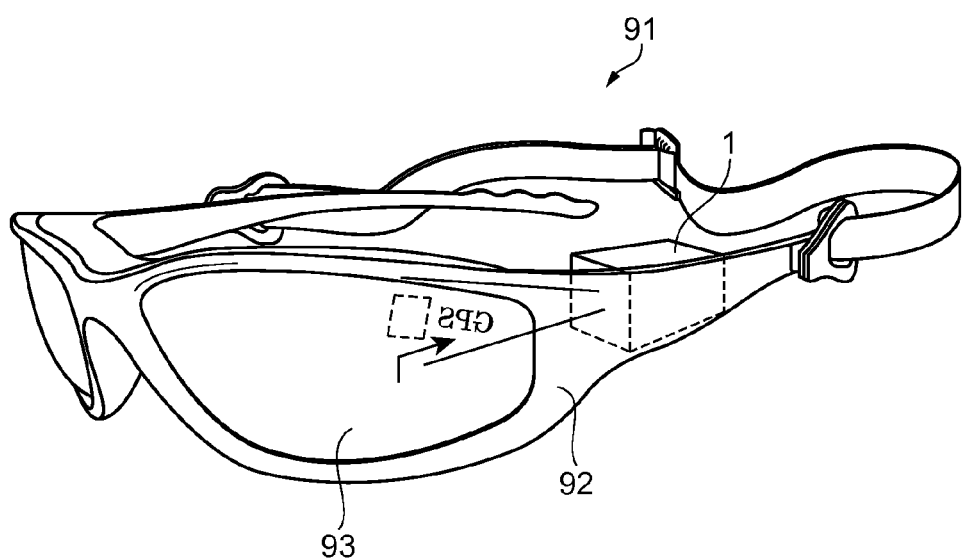
FIG. 15 is a schematic perspective view showing a head mount display according to a sixth embodiment.

FIG. 15 is a schematic perspective view showing a head mount display. As shown in FIG. 15, a head mount display 91 includes a frame 92 to be mounted on a head of a viewer, and the image display device 1 mounted on the frame 92. The drawing light source unit 4 and the optical scanner 5 are installed in the image display device 1. The image display device 1 displays a predetermined image to be recognized with one eye, on a display portion 93 provided at a portion of a lens of the frame 92. Alternatively, the drawing laser light 3 may be reflected by the display portion 93 so as to form a virtual image on a retina of a viewer.

The display portion 93 may be transparent or may be opaque. When the display portion 93 is transparent, a viewer can see the background which is seen through the display portion 93 and information from the image display device 1 in an overlapped manner. The display portion 93 may reflect at least a part of the incident light beam or a half mirror can be used as the display portion 93, for example. In addition, two image display devices 1 may be provided on the head mount display 91, and an image may be displayed on two display portions so as to recognize the image with both eyes.

The drawing light source unit 4 and the optical scanner 5 are installed in the image display device 1. In the optical scanner 5 installed in the image display device 1, the thin plate structure portion 27a functions as a damper with the air current 51 generated around the thin plate structure portion 27a. Accordingly, it is possible to set the oscillation of the displacement portion 27 around the horizontal axis 11 to hardly react with respect to the driving with the high frequency. Thus, when the reflection surface 5a oscillates around the horizontal axis 11, it is possible to set the reflection surface 5a to hardly react with respect to the driving with the high frequency. The head mount display 91 can include the optical scanner 5 having excellent vibration performance and an image which is easy for a viewer to see can be displayed.

Hereinabove, the optical scanner 5, the image display device 1, the heads-up display 87, the head mount display 91, and the manufacturing method of the optical scanner 5 have been described, but the invention is not limited thereto, and configurations of the units can be substituted with arbitrary configurations having the same functions. In addition, the other arbitrary configurations may be added to the invention. Modification examples are described as follows.

MODIFICATION EXAMPLE 1

In the first embodiment, the movable plate 30 has a circular shape in a plan view seen from the Z direction side, but a planar shape of the movable plate 30 is not limited thereto and may be a square, an ellipse or a polygon, for example. The embodiment may be set to be easily manufactured.

In the second embodiment, the movable plate 69, the support 71, and the reflection plate 72 have a circular shape in a plan view seen from the Z direction side, but there is no limitation, and the shape of the components may be a square, an ellipse or a polygon, for example.

MODIFICATION EXAMPLE 2

In the first embodiment, the direction in which the first shaft portion 28 and the second shaft portion 29 extend, and the direction in which the third shaft portion 25 and the fourth shaft portion 26 extend are orthogonal to each other. The direction in which the first shaft portion 28 and the second shaft portion 29 extend, and the direction in which the third shaft portion 25 and the fourth shaft portion 26 extend may intersect with each other diagonally. At that time, it is also possible to oscillate the reflection surface 5a to draw a two-dimensional image by using the drawing laser light 3.

MODIFICATION EXAMPLE 3

In the third embodiment, the weight portions 78 are installed on the positive Z direction side of the displacement portion 27. In the fourth embodiment, the weight portions 83 are installed on the negative Z direction side of the displacement portion 27. The weight portions may be installed on both of the positive Z direction side and the negative Z direction side of the displacement portion 27. The position of the weight portions may be adjusted in accordance with the operation of the displacement portion 27.

In the optical scanner 60 of the second embodiment in which the light reflection unit 70 is installed, the weight portions 78 may be installed on the positive Z direction side of the displacement portion 64. In addition, in the optical scanner 60, the weight portions 83 may be installed on the negative Z direction side of the displacement portion 64. The weight portions may be installed on both of the positive Z direction side and the negative Z direction side of the displacement portion 64. The position of the weight portions may be adjusted in accordance with the operation of the displacement portion 64.

MODIFICATION EXAMPLE 4

In the first embodiment, the first actuator 18 and the second actuator 21 are installed on the surface of the first beam portion 17 on the positive Z direction side. The first actuator 18 and the second actuator 21 may be installed on the surface of the first beam portion 17 on the negative Z direction side. The third actuator 23 and the fourth actuator 24 are installed on the surface of the second beam portion 22 on the positive Z direction side. The third actuator 23 and the fourth actuator 24 may be installed on the surface of the second beam portion 22 on the negative Z direction side. The embodiment may be set to be easily manufactured.

MODIFICATION EXAMPLE 5

In the fifth embodiment and the sixth embodiment, the optical scanner 5 is used in the image display device 1. Instead of the optical scanner 5, the optical scanner 60, the optical scanner 76, or the optical scanner 81 may be used. The optical scanner of the modification examples may be used in the image display device 1. At that time, it is also possible to draw an image with excellent quality.

The entire disclosure of Japanese Patent Application No. 2013-223979, filed Oct. 29, 2013 is expressly incorporated by reference herein.

What is claimed is:

1. An optical scanner comprising:
a movable plate which includes a light reflection unit which reflects light;
a first torsion bar which oscillatably supports the movable plate around a first axis;
a first displacement member which is connected to the first torsion bar;
a second torsion bar which oscillatably supports the first displacement member around a second axis intersecting with the first axis;
a second displacement member which is connected to the second torsion bar; and
an actuator which is installed on the second displacement member and applies a displacement to the second displacement member so as to apply torsional deformation and bending deformation to the second torsion bar,
wherein the first displacement member includes a frame member surrounding the movable plate, and a damper which has a smaller thickness than that of the frame member and extends in a direction intersecting with a direction in which the second torsion bar extends from the frame member.

2. The optical scanner according to claim 1,
wherein a thickness of the damper at a position separated from the second torsion bar is greater than a thickness thereof at a position closer to the second torsion bar.

3. The optical scanner according to claim 1,
wherein a length of the first displacement member in a direction in which the first torsion bar extends is greater than a length of the first displacement member in a direction in which the second torsion bar extends.

4. The optical scanner according to claim 1,
wherein the light reflection unit includes a reflection plate and a support which supports the reflection plate, and
the reflection plate and the first displacement member are installed at an interval in a thickness direction of the reflection plate, and the reflection plate partially overlaps with the first displacement member in a plan view.

5. The optical scanner according to claim 2,
wherein a portion of the damper at a position with a great thickness is protruded to the opposite side to the side where the frame member is protruded in the thickness direction with respect to the damper.

6. An image display device comprising:
a light source which emits light; and
an optical scanner,
wherein the optical scanner includes
a movable plate which includes a light reflection unit which reflects light,
a first torsion bar which oscillatably supports the movable plate around a first axis,
a first displacement member which is connected to the first torsion bar,
a second torsion bar which oscillatably supports the first displacement member around a second axis intersecting with the first axis,
a second displacement member which is connected to the second torsion bar, and
an actuator which is installed on the second displacement member and applies a displacement to the second displacement member so as to apply torsional deformation and bending deformation to the second torsion bar, and
the first displacement member includes a frame surrounding the movable plate, and a damper which has a smaller thickness than that of the frame member and extends in a direction intersecting with a direction in which the second torsion bar extends from the frame member.

7. The image display device according to claim 6 further comprising:
a frame to be mounted on a head of a viewer; and
wherein the optical scanner is provided on the frame so as to provide a head mount display.

8. The image display device according to claim 6 further comprising:
A dashboard of a vehicle; and
wherein the optical scanner is provided to the dashboard so as to provide a heads-up display which emits light on a windshield of the vehicle.

* * * * *